United States Patent [19]

Tsukahara et al.

[11] Patent Number: 5,732,289
[45] Date of Patent: Mar. 24, 1998

[54] DETECTING APPARATUS

[75] Inventors: Daiki Tsukahara, Hiratsuka; Hidenobu Kaji; Yoshio Imura, both of Kawasaki, all of Japan

[73] Assignee: Nikon Corporation, Tokyo, Japan

[21] Appl. No.: 786,098

[22] Filed: Jan. 17, 1997

Related U.S. Application Data

[63] Continuation of Ser. No. 364,493, Dec. 27, 1994, abandoned.

[30] Foreign Application Priority Data

Dec. 28, 1993 [JP] Japan ................... 5-352726
Dec. 30, 1993 [JP] Japan ................... 5-354433

[51] Int. Cl.$^6$ .............. G03B 17/00; H01L 41/08
[52] U.S. Cl. .................. 396/50; 396/53; 310/338
[58] Field of Search ............ 73/514.33, 514.36, 73/514.37, 514.34, 514.18, 714, 729.1, 756; 33/366; 354/289.11, 289.12; 396/50, 52, 53, 55; 310/338, 339, 329

[56] References Cited

U.S. PATENT DOCUMENTS

| | | | |
|---|---|---|---|
| 4,146,780 | 3/1979 | Sprey | 235/412 |
| 4,354,134 | 10/1982 | Micheron | 310/800 |
| 4,932,261 | 6/1990 | Henrion | 73/517 |
| 5,020,369 | 6/1991 | Washisu et al. | 73/517 A |
| 5,095,762 | 3/1992 | Holm-Kennedy et al. | 73/862.04 |
| 5,115,291 | 5/1992 | Stokes | 357/26 |
| 5,258,795 | 11/1993 | Lucas | 354/289.12 |
| 5,258,805 | 11/1993 | Aoki et al. | 354/475 |
| 5,335,177 | 8/1994 | Boiteau et al. | 364/424.06 |
| 5,335,190 | 8/1994 | Nagle et al. | 364/571.01 |
| 5,353,641 | 10/1994 | Tang | 73/517 R |
| 5,389,997 | 2/1995 | Ohishi | 354/430 |
| 5,463,443 | 10/1995 | Tanaka et al. | 354/430 |
| 5,479,715 | 1/1996 | Schultheis et al. | 33/366 |
| 5,495,762 | 3/1996 | Tamura et al. | 73/519.01 |
| 5,497,156 | 3/1996 | Bushman | 342/9 |
| 5,524,894 | 6/1996 | Shannon | 473/209 |
| 5,541,697 | 7/1996 | McIntyre | 354/289.11 |
| 5,594,170 | 1/1997 | Peters | 73/514.29 |
| 5,631,421 | 5/1997 | Ohgke et al. | 73/514.34 |

FOREIGN PATENT DOCUMENTS

| | | | |
|---|---|---|---|
| 3-202777 | 9/1991 | Japan | 73/514.33 |
| A-125532 | 4/1992 | Japan . | |
| 6-117804 | 4/1994 | Japan | 73/514.33 |
| 763225 | 12/1956 | United Kingdom | 73/514.33 |

OTHER PUBLICATIONS

American Institute of Physics Handbook. Gray, Dwight E. pp. 2–10, 1957.

*Primary Examiner*—Safet Metjahic
*Assistant Examiner*—Christopher E. Mahoney
*Attorney, Agent, or Firm*—Oliff & Berridge

[57] ABSTRACT

A detecting apparatus which includes a balancer which generates a moment of rotation around an axis; and a pressure sensing sheet which contacts at one or more contact points with the balancer and outputs a pressure signal corresponding to a force acting on the contact point and depends on the moment of rotation. An attitude detecting apparatus and a detecting apparatus for difference of attitude each of which includes, the detecting apparatus; and an arithmetic circuit which receives a pressure signal at predefined time intervals in order and processes a calculation.

33 Claims, 20 Drawing Sheets

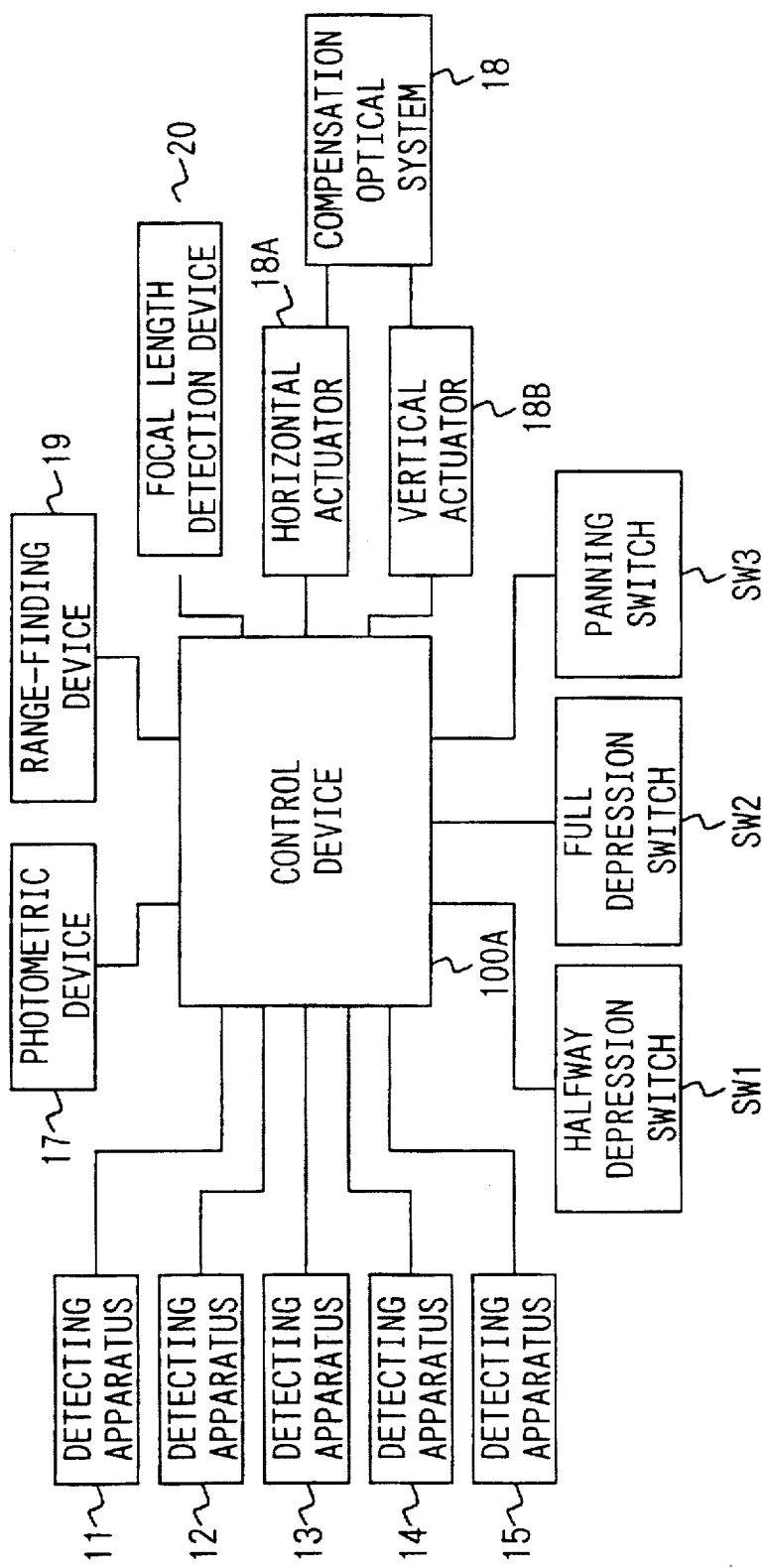

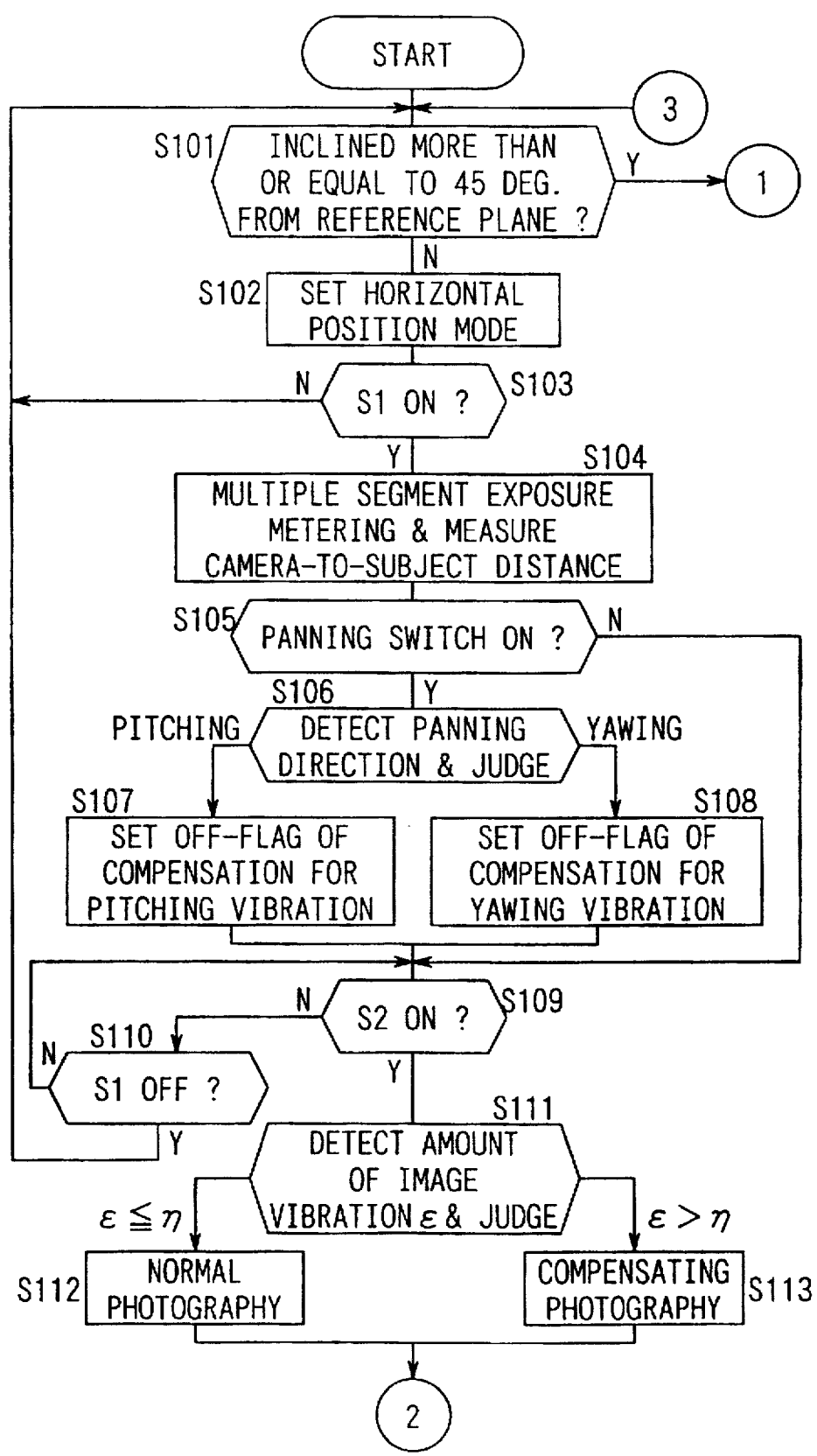

DETECTING APPARATUS

This is a continuation of application Ser. No. 08/364,493 filed Dec. 27, 1994 now abandoned.

BACKGROUND OF THE INVENTION

1. Field of the Invention

The present invention relates to a detecting apparatus which detects an attitude of a camera or the like and an acceleration acting on a camera or the like, and an image vibration-proof camera which comprises the detecting apparatus.

2. Description of the Prior Art

Hitherto, an attitude detecting apparatus is known, wherein mercury which is enclosed in a glass capsule moves according to an attitude change to short-circuit electrodes which are mounted in the capsule, so that the attitude change is detected. For example, this is utilized for a so-called vertical position sensor which detects an attitude of a camera. In this vertical position sensor, when the way a camera being held changed from in a horizontal position to in a vertical position, mercury in a glass tube moves and electrodes in the glass tube are short-circuited by this mercury, and then it is judged that the way camera being held is in the vertical position by detecting the short circuit of the electrodes. The detected result of the vertical position sensor is utilized for switching a photometric output of a multiple segment exposure metering, which is implemented on a single-lens reflex camera, from a pattern for a horizontal position to a pattern for a vertical position. Consequently, an accurate multiple segment exposure metering can be realized even if a camera is held in a vertical position. However, the attitude detecting apparatus can detect only two kinds of attitude with on and off.

On the other hand, a 35 mm camera is known, wherein an acceleration sensor or a vibration sensor is utilized for a camera vibration detecting sensor to detect a camera vibration and a vibration prevention device which prevents an image vibration by driving a compensation lens according to the detected result is implemented. However, the structure of these sensors is complicated and the cost is expensive. Consequently, the cost is required to be lower and miniaturizing of camera vibration sensors is required in order to miniaturize a camera furthermore.

In addition, there have been known the one which detects an attitude of a magnet provided in an object to be detected by a magnetoresistive element as disclosed in Japanese Laid-open Patent Publication No. 4-125532.

SUMMARY OF THE INVENTION

The object of the present invention is to provide a detecting apparatus which detects an attitude or an acceleration by measuring a value of pressure acting on a pressure sensing sheet with a combination of a balancer and the pressure sensing sheet without using mercury and magnetism.

Another object of the present invention is to provide a camera capable of detecting an attitude and an image vibration-proof camera which comprise the above described detecting apparatus to realize miniaturizing, being low-cost and simplifying of structure with regard to the cameras.

In order to attain these objects, a detecting apparatus according to the present invention, comprises: a balancer which generates a moment of rotation around an axis; and a pressure sensing sheet which contacts at one or more contact points with the balancer and outputs a pressure signal corresponding to a force which acts on the contact point and depends on the moment of rotation. Further, the detecting apparatus can calculate an attitude and an acceleration based on the pressure signal which is received in order per unit time.

An image vibration-proof camera according to the present invention, comprises: a photographic lens through which light from a subject forms an image on a recording media; an attitude detecting apparatus which detects whether the camera is held in a horizontal position or in a vertical position; a first detecting apparatus and a second detecting apparatus which are arranged in a vertical plane of the camera parallel to an optical axis of the photographic lens so that a moment of rotation of a balancer is generated in the vertical plane; and a third detecting apparatus and a fourth detecting apparatus which are arranged in a horizontal plane of the camera so that a moment of rotation of the balancer is generated in the horizontal plane.

The image vibration-proof camera, further comprises: an arithmetic circuit which, (a) when the attitude detecting apparatus judges that the camera is held in a horizontal position, receives the pressure signal from the first detecting apparatus at predefined time intervals in order and calculates a difference of attitude, and then calculates an amount of image vibration caused by a pitching vibration based on the difference of attitude, and also receives the pressure signal from the third and fourth detecting apparatuses and calculates an acceleration acting on the balancer based on the received pressure signal, and then calculates an amount of image vibration caused by a yawing vibration, and which, (b) when the attitude detecting apparatus judges that the camera is held in a vertical position, receives the pressure signal from the third detecting apparatus at predefined time intervals in order and calculates a difference of attitude, and then calculates an amount of image vibration caused by a pitching vibration based on the difference of attitude, and also receives the pressure signal from the first and second detecting apparatuses and calculates an acceleration acting on the balancer based on the received pressure signal, and then calculates an amount of image vibration caused by a yawing vibration; and a compensation optical system which compensates the light from a subject lead to the recording media through the photographic lens based on the amounts of image vibration caused by the pitching vibration and the yawing vibration in order to prevent the image vibration from occurring on the recording media.

As described above, since the detecting apparatus according to the present invention obtains a pressure by using a balancer and a pressure sensing sheet contacted with the balancer and detects an attitude or an acceleration based on the pressure value, it becomes possible to realize simplifying, miniaturizing and being low-cost with regard to the apparatus.

Since the image vibration-proof camera according to the present invention detects an attitude and a vibration of the camera body by using the above-described detecting apparatus, it becomes possible to realize miniaturizing, being low-cost and simplifying of structure with regard to the camera in addition to effect of the above-described detecting apparatus. Further, the camera detects whether it is held in a horizontal position or a vertical position, so that a threshold value with which a camera vibration is judged changes according to the detection. As a result, it becomes possible to prevent an image vibration more effectively from occurring.

BRIEF DESCRIPTION OF THE DRAWINGS

FIG. 11 is a block diagram of an embodiment of an image vibration-proof camera according to the present invention.

FIGS. 16A and 16B are flow-charts which explain an operation of an embodiment of an image vibration-proof camera according to the present invention.

DESCRIPTION OF THE PREFERRED EMBODIMENTS

<Embodiment—1 of a Detecting Apparatus>

Figure 1:
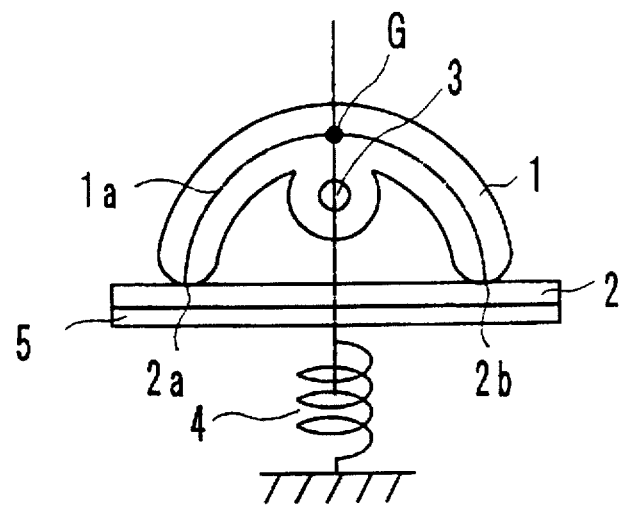
FIG. 1 is a front view of an embodiment of a detecting apparatus according to the present invention.

FIG. 1 is a front view which shows an embodiment of a detecting apparatus having two contact points. The detecting apparatus comprises a balancer 1, a pressure sensing sheet 2 and a spring 4. As shown in FIG. 1, the balancer is formed as a sheet member which is arc-shaped, and a center line 1a of the sheet member draws almost a half circle. The balancer 1 is rotatably supported at the center thereof to a rotation axis 3, and is formed such that it is symmetric with respect to a line which passes from the rotation axis 3 to the center of gravity G of the balancer 1. The pressure sensing sheet 2 is a pressure sensor which transduces a force added on the pressure sensing sheet to an electrical signal, wherein the pressure sensing sheet 2 comprises a thin film which is formed from material which resistance varies according to an added force, electrodes which are arranged on the upside and the downside the thin film, and protective sheets which are arranged on the outer sides. The pressure sensing sheet 2 is mounted on a board 5 and urged against the balancer 1 by the spring 4 which is supported on the same body as the rotation axis 3 so that the pressure sensing sheet 2 contacts the balancer 1 with an adequate force. Right and left edges of the balancer contact the pressure sensing sheet 2 at contact points 2a and 2b.

In the detecting apparatus, when the body which supports the axis 3 and the spring 4 is positioned as in FIG. 1, since the action line of gravity of the balancer 1 at the center of gravity G passes the rotation axis 3, no moment is generated on the balancer 1. Consequently, a pressure at the contact point 2a equals to a pressure at the contact point 2b. When the body is inclined to the right or the left from the attitude in FIG. 1, the above described action line of gravity of the balancer 1 deviates from the rotation axis 3, accordingly, a moment is generated on the balancer 1 around the rotation axis 3. The pressures at contact points 2a and 2b change according to the moment. An attitude of the body can be detected based on the difference of the pressures. Or an angular velocity which acts on the body can be detected based on a change of the pressure per time.

<Embodiment—2 of a Detecting Apparatus>

Figure 2:
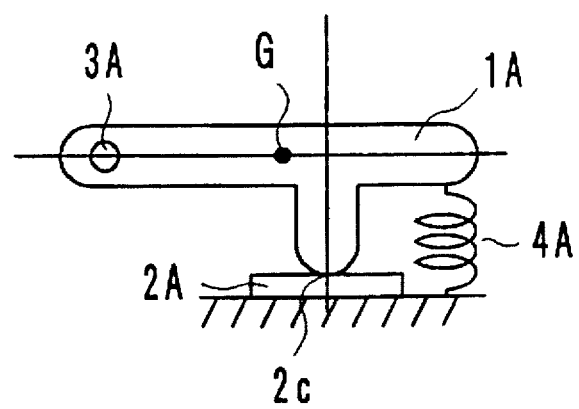
FIG. 2 is a front view of another embodiment of a detecting apparatus according to the present invention.

FIG. 2 is a front view which shows an embodiment of a detecting apparatus which has one contact point. The detecting apparatus comprises a balancer 1A, a pressure sensing sheet 2A and a spring 4A. As shown in FIG. 2, the balancer 1A is formed as a sheet member which is a shape of modified T. The left edge of the balancer 1A is rotatably supported to an rotation axis 3A, and the bottom edge of the balancer 1A contacts the pressure sensing sheet 2A at a contact point 2c. The balancer 1A is pulled by the spring 4A at the right edge thereof so that the contact point 2c contacts the pressure sensing sheet 2A with an adequate pressure. The pressure sensing sheet 2A is a pressure sensor which has the same configuration as the above-described pressure sensing sheet 2. The rotation axis the pressure sensing sheet 2A and the spring 4A are supported by the same body.

In this detecting apparatus, when the pressure sensing sheet 2A is in a horizontal position as shown in FIG. 2, a force corresponding to the sum of a vertical force caused by a moment at the contact point 2c based on the weight of the balancer 1A around the rotation axis 3A and a vertical force caused by a moment at the contact point 2c based on the force of the spring 4A around the rotation axis 3A, acts on the pressure sensing sheet 2A. When the body is inclined to the right or the left, the moment based on the weight of the balancer 1A around the rotation axis 3A changes, accordingly the pressure at the contact point 2c changes. The inclination of the body can be detected based on these pressures.

<Embodiment of an Attitude Detecting Apparatus>

Figure 3:
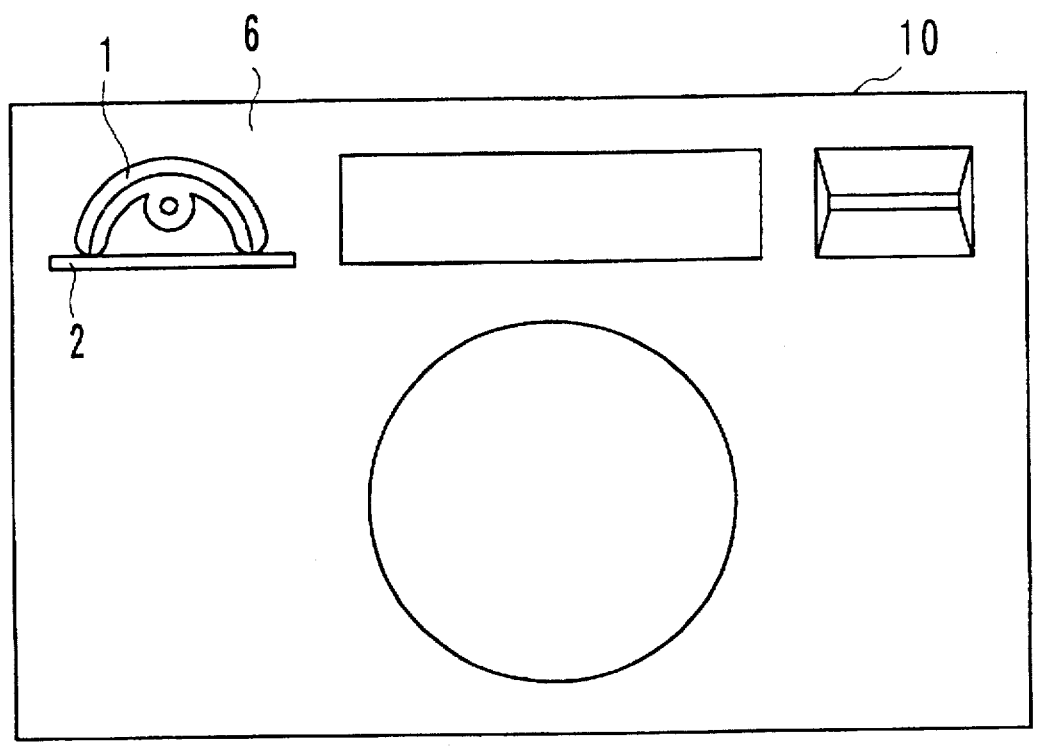
FIG. 3 is a front view of an embodiment of a camera which is equipped with a detecting apparatus according to the present invention.
Figure 4:
FIG. 4 is a block diagram of an embodiment of an attitude detecting apparatus according to the present invention.

An attitude detecting apparatus which detects an attitude by using a detecting apparatus which has two contact points as shown in FIG. 1 will be explained referring to a camera which is equipped with the attitude detecting apparatus. FIG. 3 is a front view of a camera 10 equipped with a detecting apparatus 6 which detects an attitude. FIG. 4 is a block diagram of the attitude detecting apparatus. In this embodiment, the detecting apparatus 6 is arranged in the upper left hand corner of the camera so that a pressure sensing sheet 2 is parallel to the upper plane of the camera. An attitude of the camera 10, that is an attitude of a balancer 1, is transmitted to a control device 100 as a pressure distribution of the pressure sensing sheet 2. The control device 100 comprises a CPU, a ROM, a RAM and other peripherals. The control device 100 transduces an electrical signal from the pressure sensing sheet 2 to a digital signal and performs a predefined calculation based on the data.

Figure 5A:
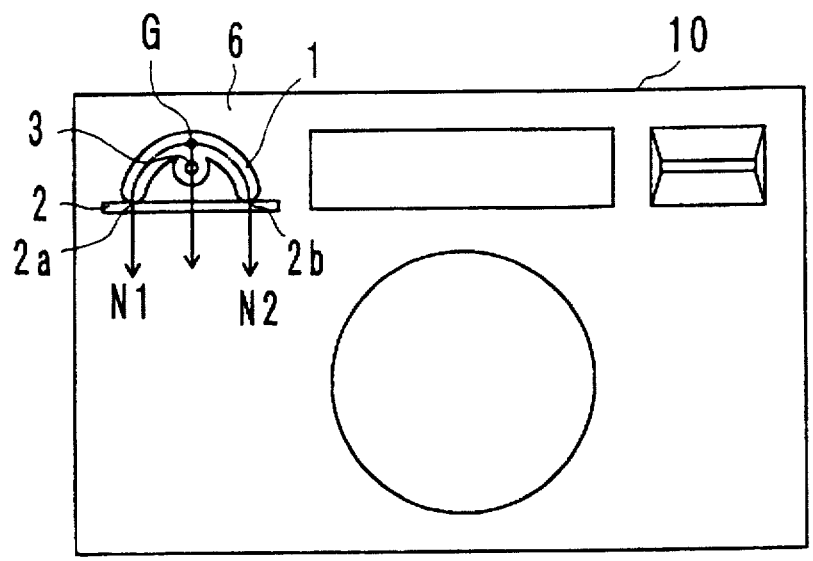
FIGS. 5A and 5B are a front view of a camera which is equipped with an attitude detecting apparatus according to the present invention and is in a horizontal position, and an output characteristic chart of the attitude detecting apparatus for the camera in a horizontal position.
Figure 5B:
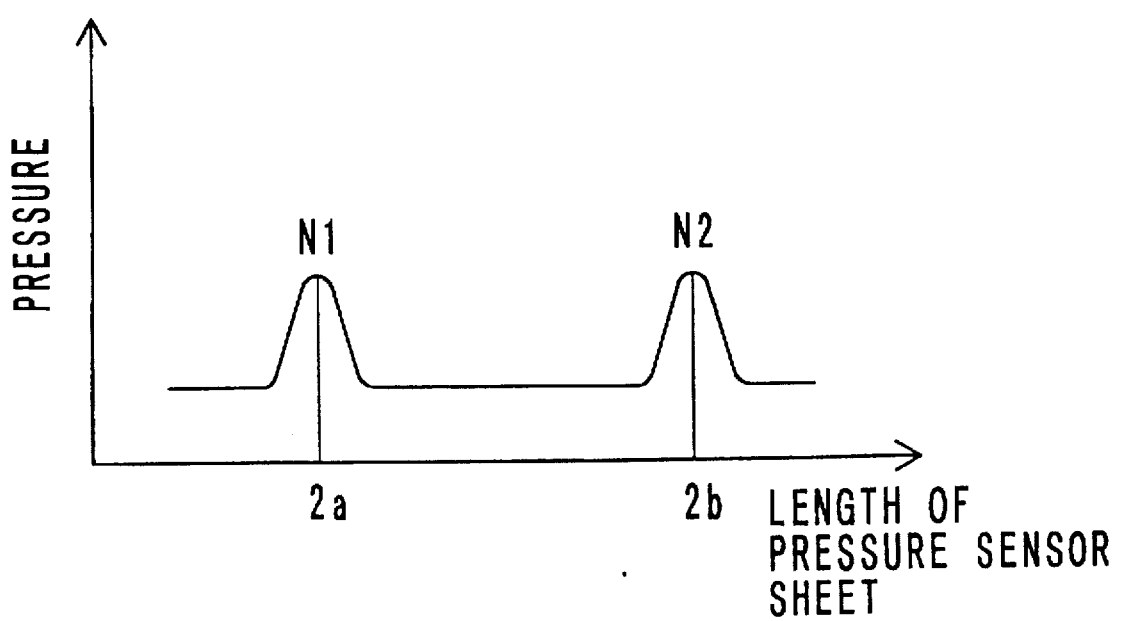

When the camera 10 is in a horizontal position as shown in FIG. 5A, the action line of gravity of the balancer 1 at the center of gravity G passes an rotation axis 3. The pressure sensing sheet 2 is urged against the balancer 1 with a constant certain force by a spring 4 (not shown in FIG. 5A) as shown in FIG. 1. At this time, if forces received by the pressure sensing sheet 2 at contact points 2a and 2b are represented by N1 and N2, a following expression is shown and a pressure pattern of the pressure sensing sheet 2 is obtained as in FIG. 5B.

$$N1=N2 \quad (1)$$

Figure 6A:
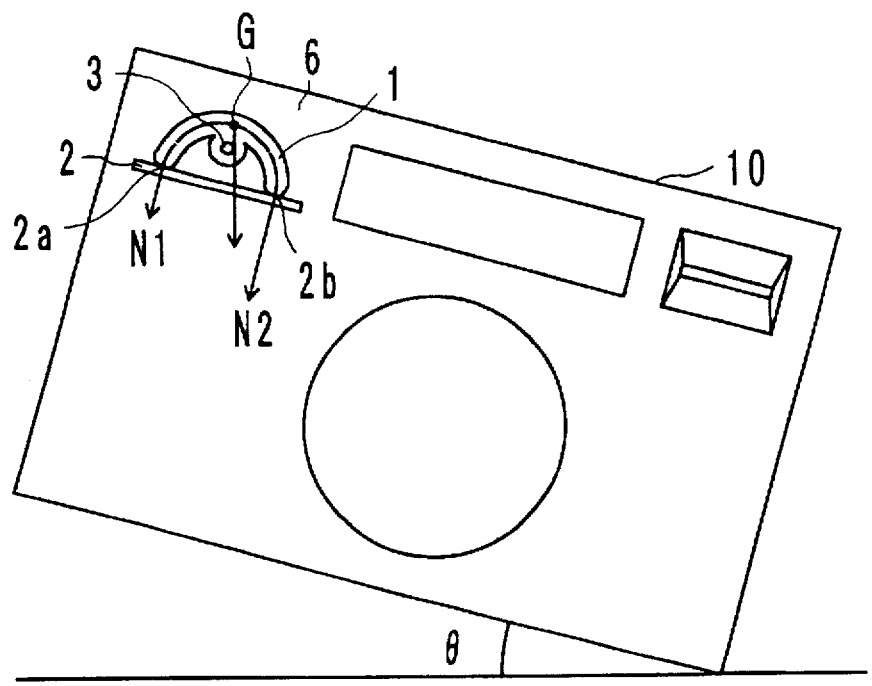
FIGS. 6A and 6B are a front view of a camera which is equipped with an attitude detecting apparatus according to the present invention and is inclined to the right, and an output characteristic chart of the attitude detecting apparatus for the camera thus inclined.
Figure 6B:
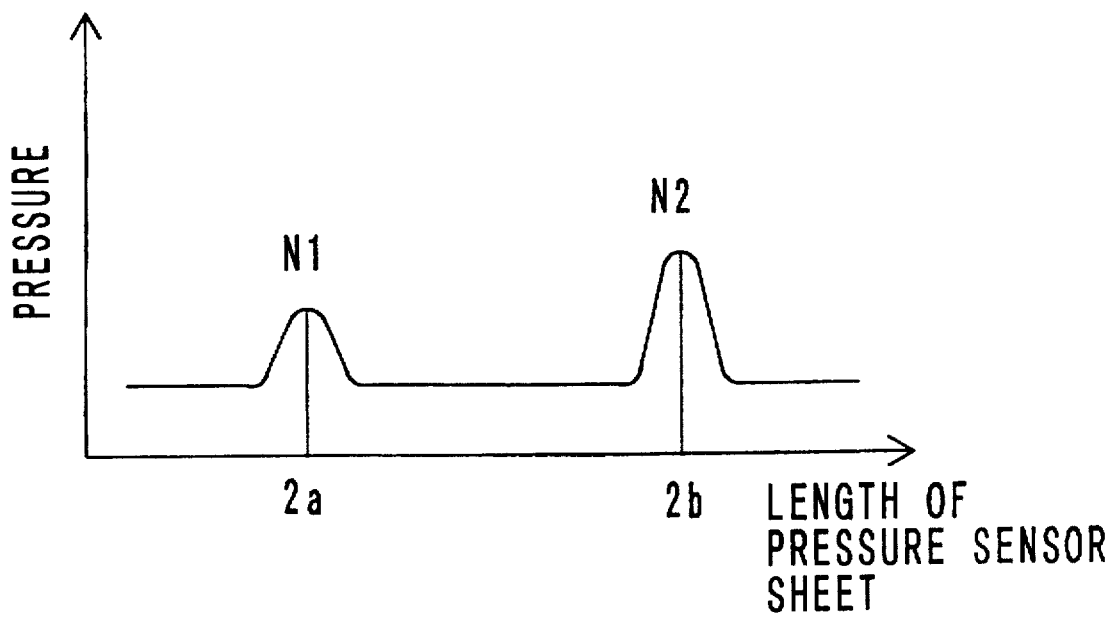

When the camera 10 is inclined to the right as shown in FIG. 6A, the action line of gravity of the balancer 1 at the center of gravity G passes at the side of the contact point 2b. At this time, a following expression is shown and a pressure pattern of the pressure sensing sheet 2 is obtained as in FIG. 6B.

$$N1<N2 \quad (2)$$

Figure 7A:
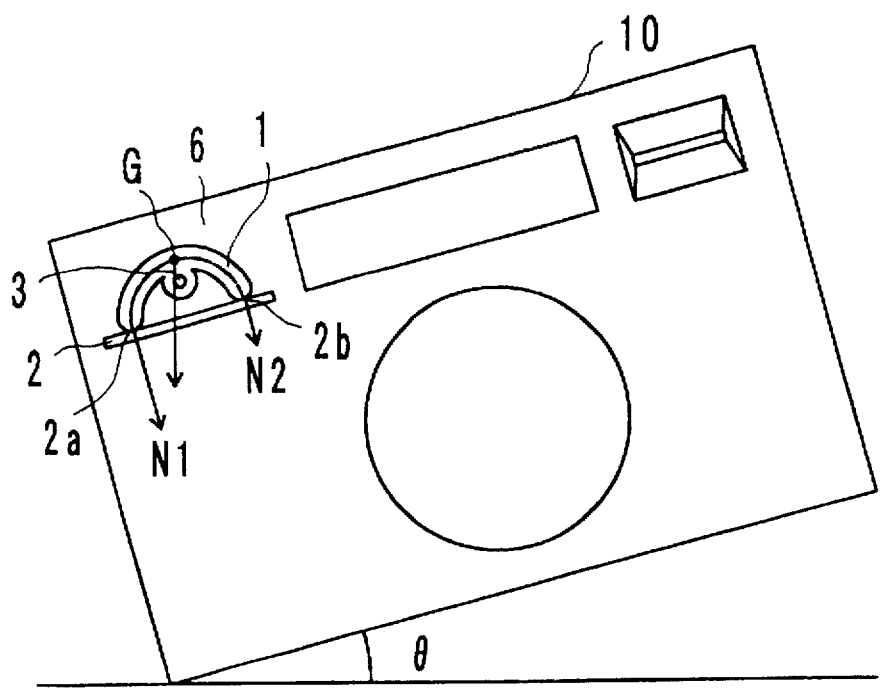
FIGS. 7A and 7B are a front view of a camera which is equipped with an attitude detecting apparatus according to the present invention and is inclined to the left, and an output characteristic chart of the attitude detecting apparatus for the camera thus inclined.
Figure 7B:
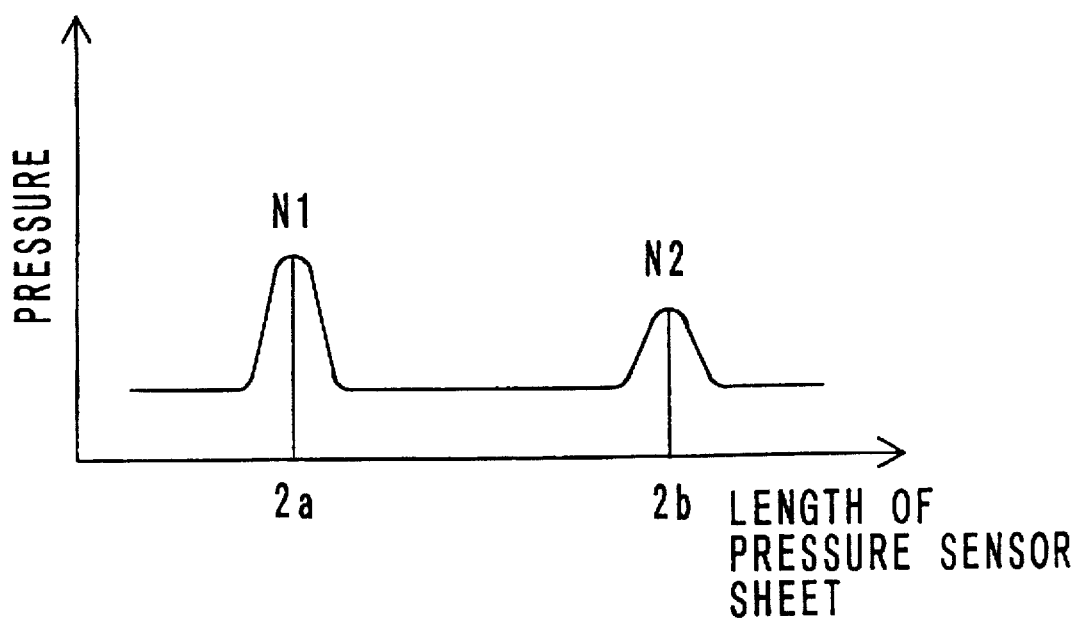

When the camera 10 is inclined to the left as shown in FIG. 7A, the action line of gravity of the balancer 1 at the center of gravity G passes at the side of the contact point 2a. At this time, a following expression is shown and a pressure pattern of the pressure sensing sheet 2 is obtained as in FIG. 7B.

$$N1>N2 \quad (3)$$

If an inclination of the camera 10 is represented by θ, a following expression is shown.

$$\theta = TAN^{-1}\{(N1-N2)/(N1+N2)\} \quad (4)$$

If N1/N2 is replaced by A, a following expression is shown.

$$\theta = TAN^{-1}\{(A-1)/(A+1)\} \quad (5)$$

Consequently, if absolute values of pressures or a ratio of pressures which are sent from the pressure sensing sheet are obtained, an inclination θ of the camera, that is an attitude of the camera, can be detected by performing a calculation of the expression (4) or (5) in the control device 100.

<Embodiment—1 of an Acceleration Detecting Apparatus>

Figure 8A:
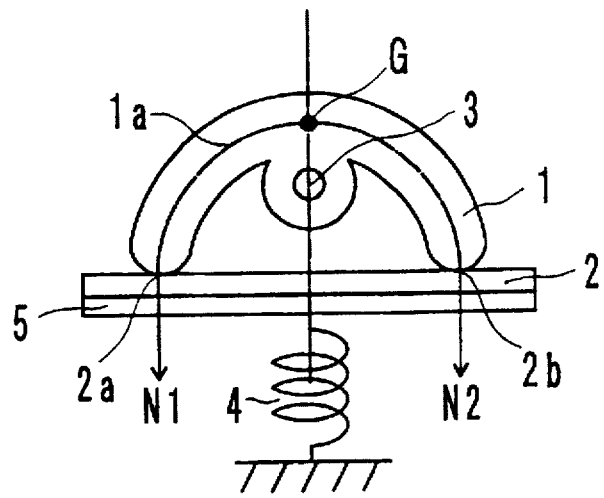
FIGS. 8A and 8B are figures which explain an acceleration detecting apparatus according to the present invention.
Figure 8B:
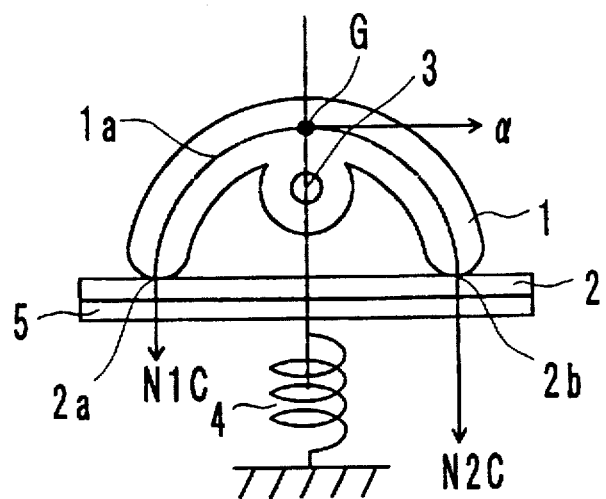

A detecting apparatus which has two contact points as shown in FIG. 1 can be utilized for an acceleration detecting apparatus. An explanation will be made with references to FIGS. 8A and 8B. In this detecting apparatus, an acceleration α in a direction perpendicular to a line connecting from the center of gravity of a balancer 1 to an rotation axis 3 is detected. Consequently, a pressure sensing sheet 2 extends in a direction of the acceleration to be detected. As shown in FIG. 8A, the balancer which can swing freely around a rotation axis 3 is arranged in a horizontal plane. Consequently, even if the detecting apparatus is arranged in any directions in a horizontal plane, a moment of the balancer 1 around the axis 3 is never generated statically. And only urging forces caused by a spring 4 are shown at contact points 2a and 2b on the pressure sensing sheet 2, and then N1=N2 is obtained. If an acceleration a is added as shown in FIG. 8B, a moment which depends on the acceleration a is generated on the balancer 1. Forces N1 and N2 which act at contact points 2a and 2b change according to a magnitude of the acceleration α. The acceleration a can be obtained by detecting these N1 and N2 with the pressure sensing sheet.

In case that two of this acceleration detecting apparatus are spaced apart from each other in the same plane, a component of rotation around a specified axis in the plane can be detected. If the plane moves only in parallel, the two acceleration detecting apparatuses receive accelerations which have the same direction and the same magnitude and then detect the same value. If the plane rotates around an axis which is perpendicular to the plane or moves accompanied with a component of rotation around the perpendicular axis, each of acceleration detecting apparatuses receives an acceleration which has a different direction and/or a different magnitude and then detects a different value each other. The difference, that is the acceleration by which a rotation around the specified axis is affected, is calculated by the control device similar to the one in the above-described attitude detecting apparatus based on these values which are inputted at every unit time in order. Further, a rotary angular velocity around the axis perpendicular to the plane can be obtained by calculation based on the acceleration thus calculated.

<Embodiment—2 of an Acceleration Detecting Apparatus>

A detecting apparatus which has one contact point as shown in FIG. 2 can be also utilized for an acceleration detecting apparatus. The configuration of the detecting apparatus is the same as the embodiment of a detecting apparatus which has one contact point as shown in FIG. 2 and the block diagram is the same as shown in FIG. 4.

<Embodiment of an Image Vibration-Proof Camera>

An explanation will be made on an embodiment of a camera equipped with the above-described detecting apparatuses shown in FIG. 1, wherein an image vibration is reduced by detecting a pitching vibration and a yawing vibration with these detecting apparatuses.

Figure 9:
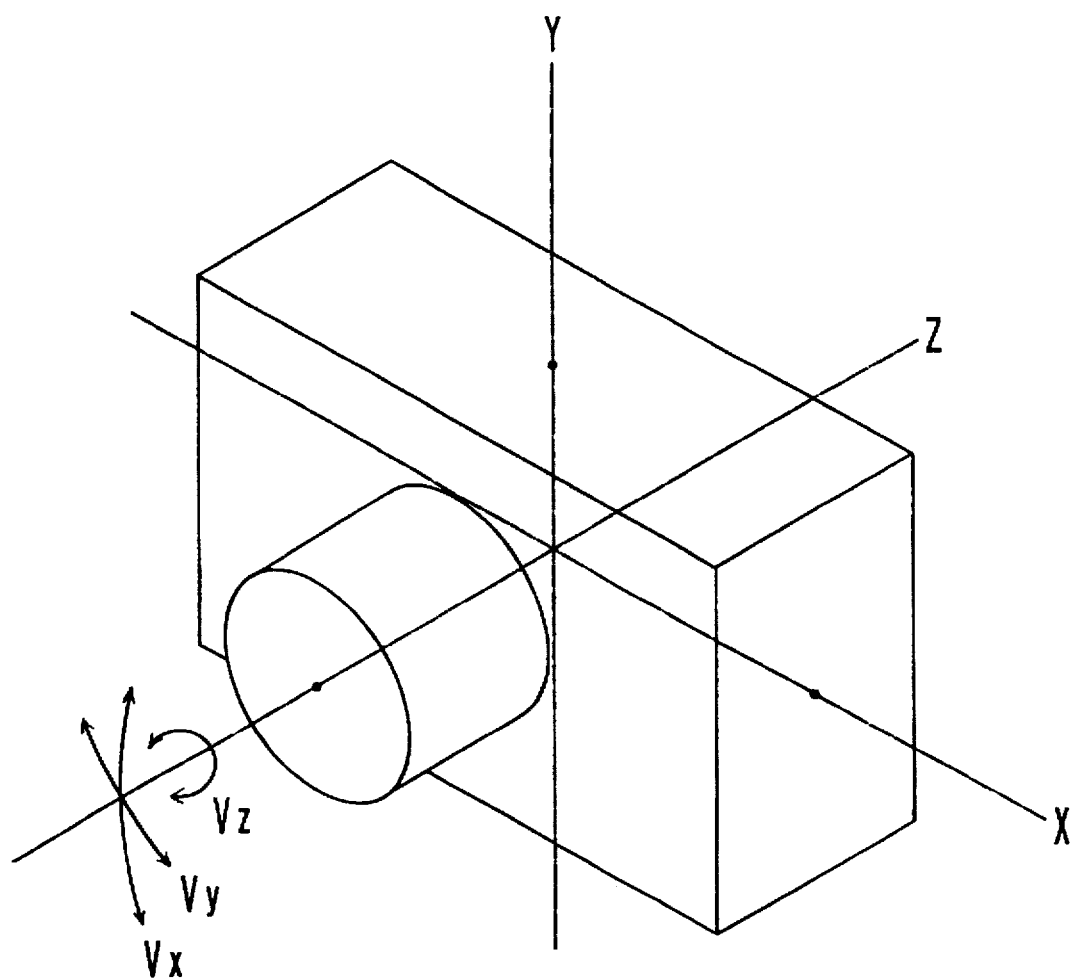
FIG. 9 is a figure which explains camera vibrations.

FIG. 9 is a figure which explains camera vibrations. When the camera vibrations are explained generally, a vibration in a horizontal direction of a camera is called a yawing vibration, a vibration in a vertical direction is called a pitching vibration, and a vibration in a rotating direction around an optical axis is called a rolling vibration. In FIG. 9, a camera is held in a horizontal position, a vibration Vy vibrated in a horizontal direction around an axis Y is a yawing vibration, a vibration Vx vibrated in a vertical direction around an axis X is a pitching vibration, and a vibration Vz vibrated in a rotating direction around an axis Z is a rolling vibration. When a camera is held in a vertical position, a pitching vibration in a vertical direction corresponds to a vibration Vy around an axis Y, a yawing vibration in a horizontal direction corresponds to a vibration Vx around an axis X, and a rolling vibration is the same.

In a camera of this embodiment, an image vibration caused by a pitching vibration and an image vibration caused by a yawing vibration are both reduced when the camera is in both horizontal position and vertical position. To this end, there are provided a pitching vibration detecting apparatus which detects a pitching vibration when the photography is performed with the camera held both in a horizontal position and in a vertical position, a yawing vibration detecting apparatus which detects a yawing vibration when the photography is performed with the camera held both in a horizontal position and in a vertical position, and an attitude detecting apparatus which detects whether the camera is held in a horizontal position or in a vertical position.

Figure 10A:
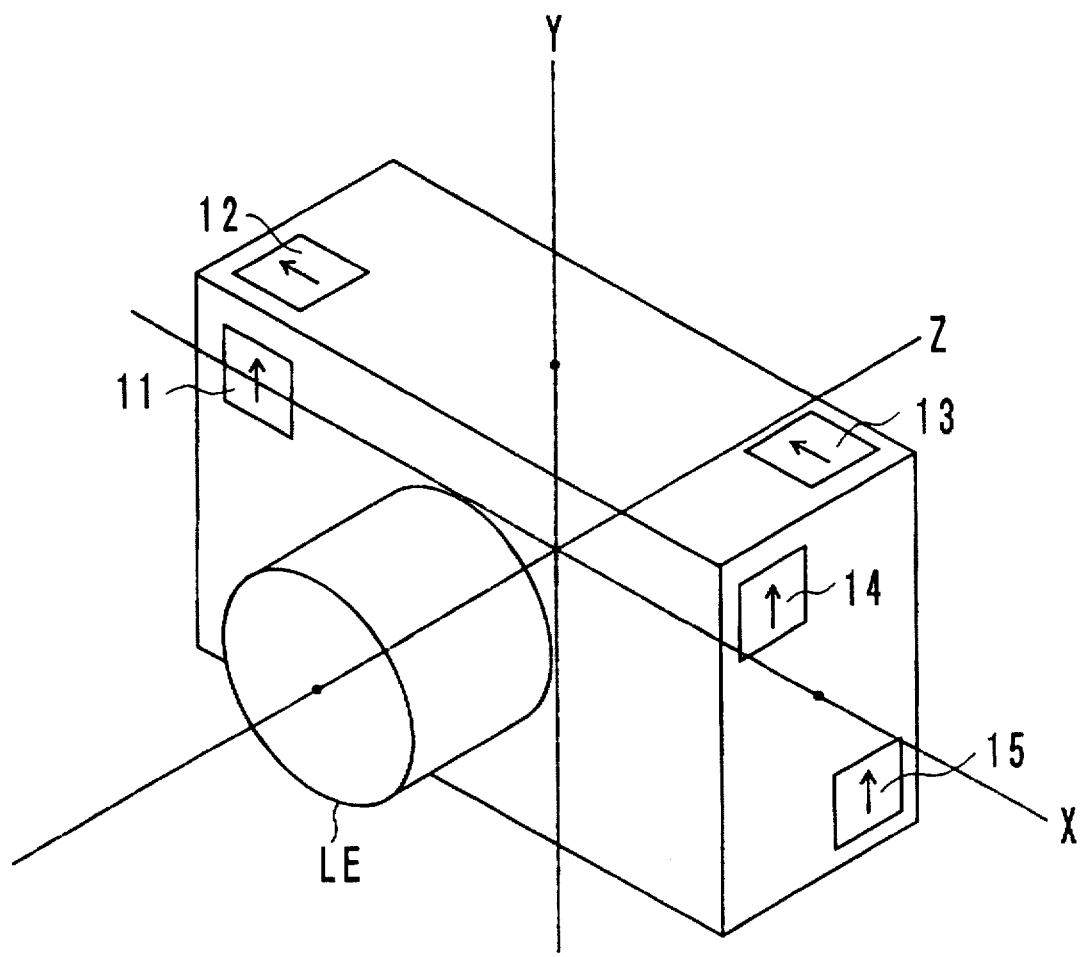
FIG. 10A is a figure showing an embodiment where detecting apparatuses are arranged in an image vibration-proof camera according to the present invention.
Figure 10B:
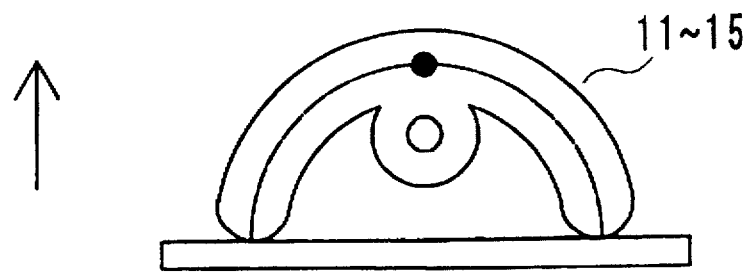
FIG. 10B is a figure which shows a orientation of the detecting apparatus in FIG. 10A.

FIG. 10A is a perspective view of the camera which is equipped with the pitching vibration detecting apparatus, the yawing vibration detecting apparatus, and the attitude detecting apparatus. The camera shown in FIG. 10A uses the detecting apparatuses which have two contact points shown in FIG. 1. The detecting apparatus is used differently for an attitude detecting apparatus, a detecting apparatus for difference of attitude or an acceleration detecting apparatus by changing a process of an output signal from a pressure sensing sheet 2. The detecting apparatus for difference of attitude obtains a difference of attitude with time on the basis of an attitude of the camera which can be detected on the same principle as the attitude detecting apparatus in view of a time factor. The pitching detecting apparatus and the yawing detection apparatus can be realized by an attitude detecting apparatus and an acceleration detecting apparatus, each of which is consist of the detecting apparatus. Detecting apparatuses 11 through 15 are arranged so that a direction of an arrow in FIG. 10A corresponds to a direction of an arrow in FIG. 10B. Details will be explained in the following.

The detecting apparatus 11 is arranged in a plane which is parallel to the front of the camera, that is parallel to a XY plane. The detecting apparatus 11 is used for an attitude detecting apparatus and detects an attitude of the camera being held in a horizontal position or in a vertical position or the like. The detecting apparatuses 12 and 13 are spaced apart from each other in a direction of an optical axis of a photographic lens LE in a plane which is parallel to the top plane of the camera, that is parallel to a XZ plane. These detecting apparatuses 12 and 13 are not necessarily in the same plane. When the camera is held in a horizontal position and these detecting apparatuses are not influenced from gravitation, they are used for acceleration detecting apparatuses and detect a yawing vibration. When the camera is held in a vertical position, either of the detecting apparatuses 12 and 13 is used for a detecting apparatus for difference of attitude and detects a pitching vibration. This switching is done based on an attitude of the camera which is detected by the detecting apparatus 11, that is, depending on whether or not the camera is inclined around a Z axis with 45 degrees.

The detecting apparatuses 14 and 15 are spaced apart from each other in a direction of the optical axis of the photographic lens in a plane which is parallel to the side plane of the camera, that is parallel to a YZ plane. These detecting apparatuses are not necessarily in the same plane. When the camera is held in a horizontal position, either of the detecting apparatuses 14 and 15 is used for a detecting apparatus for difference of attitude and detects a pitching vibration. When the camera is held in a vertical position and these detecting apparatuses are not influenced from gravitation, they are used for acceleration detecting apparatuses and detect a yawing vibration. This switching is done based on an attitude of the camera which is detected by the detecting apparatus 11, that is, depending on whether or not the camera is inclined around the Z axis with 45 degrees, in the same manner as in the detecting apparatuses 12 and 13.

FIG. 11 is a block diagram of an embodiment of an image vibration-proof camera. In FIG. 11, connected to a control device 100A which comprises a CPU, a ROM, a RAM and other peripherals are the above-mentioned detecting apparatuses 12 through 15 which detect a yawing vibration, and a pitching vibration and the above-mentioned detecting apparatus 11 which detects an attitude of the camera. A pressure sensing sheet 2 of these detecting apparatuses comprises electrodes which are arranged in matrix form on the sheet, and a voltage signal on a point of intersection of electrodes is outputted from output terminals. The control device 100A receives a voltage signal on a point of intersection of electrodes on the sheet, converts it to a digital signal and performs a calculation, then recognizes a pressure distribution on the sheet, especially pressure values on the contact points 2a and 2b. Also connected to the control device 100A are a halfway depression switch SW1 which is turned on when a release button is pressed halfway down, a full depression switch SW2 which is turned on when a release button is pressed all the way down, a panning switch SW3, and a photometric device 17 which measures a brightness value of a subject. When the panning switch SW3 is turned on, a camera vibration in a panning direction is recognized as a vibration which should not be prevented for an image vibration-proof. The switch SW3 is turned on/off by a photographer. The reference numeral 18 denotes a compensation optical system to compensate an image vibration, the reference numeral 18A denotes a horizontal actuator which drives the compensation optical axis 18 in a X direction in a XY plane perpendicular to the optical axis and the reference numeral 18B denotes a vertical actuator which drives it in a Y direction. The reference numeral 19 denotes a range-finding device which measures a distance to a subject, and the reference numeral 20 denotes a focal length detection device which detects a focal length of a lens.

Pitching vibration detection

An explanation will be made on detection of a pitching vibration Vx around the axis X of the camera in FIG. 9 when the camera is held in a horizontal position.

The attitude detection apparatus 11 detects that the camera is held in a horizontal position. Since the camera is held in a horizontal position, either of detecting apparatuses 14 and 15, for example, the output of the detecting apparatus 14 is processed so that the detecting apparatus 14 is used for a detecting apparatus for difference of attitude. There is a possibility that the accuracy of detection is improved by using both detecting apparatuses 14 and 15.

Figure 12A:
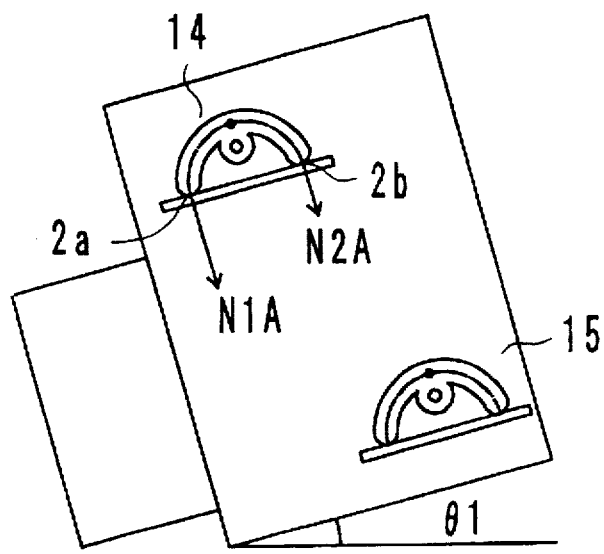
FIGS. 12A and 12B are a side view of an image vibration-proof camera according to the present invention which is inclined in a pitching direction, and an output characteristic chart of the detecting apparatus for the camera thus inclined.
Figure 12B:
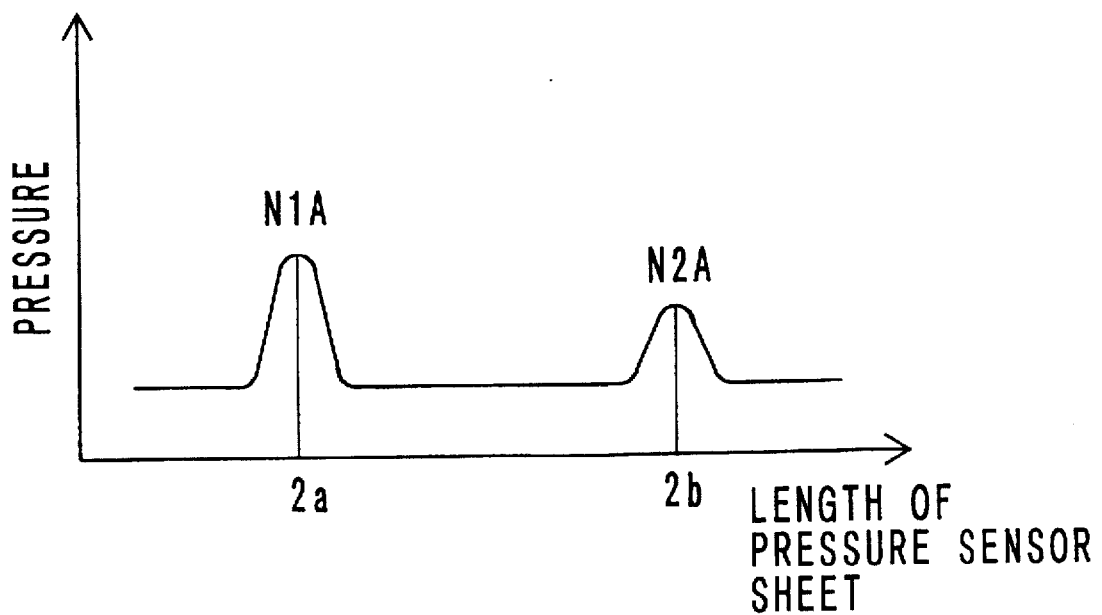

When the camera is inclined in a pitching direction with an inclination angle θ1 as shown in FIG. 12A, the detecting apparatus 14 which is installed in the camera is also inclined with the angle θ1. And forces N1A and N2A according to the inclination angle act at contact points 2a and 2b on the pressure sensing sheet 2 respectively, so that signals according to the forces are outputted from the pressure sensing sheet 2.

Pressure distribution signals which correspond to forces which are generated at contact points 2a and 2b are inputted to the control device 100A from the pressure sensing sheet 2 of the detecting apparatus 14 at predetermined time intervals in order. The control device 100A calculates forces N1A and N2A based on inputted pressure distribution signals to calculate the inclination angle θ1 of the camera in the pitching direction based on the N1A and N2A. The inclination angle θ1 can be obtained easily from the calculation of the above-described expression (4) based on the difference between the forces N1A and N2A.

Figure 13A:
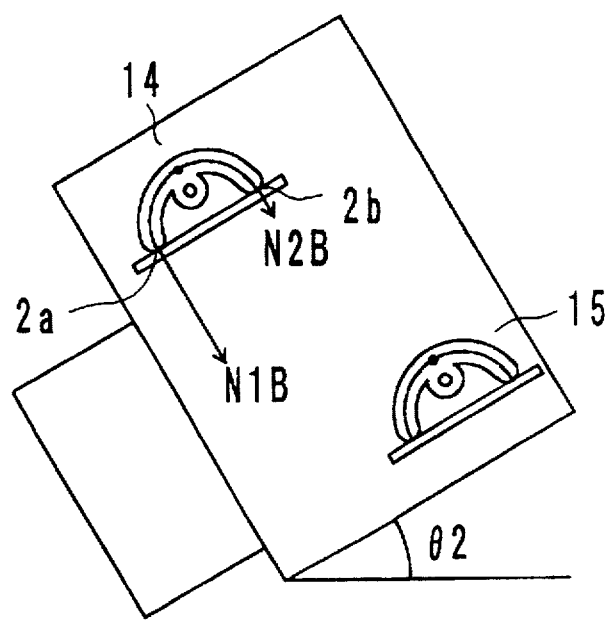
FIGS. 13A and 13B are a side view of an image vibration-proof camera according to the present invention which is inclined in a pitching direction more than FIGS. 12A and 12B, and an output characteristic chart of the detecting apparatus for the camera thus inclined.
Figure 13B:
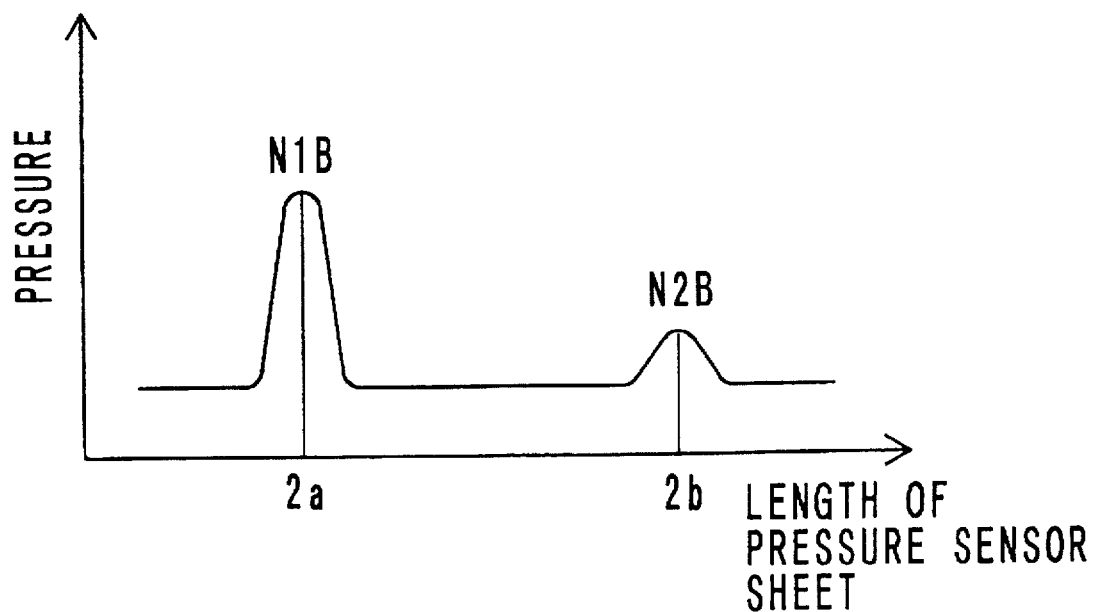
Figure 14A:
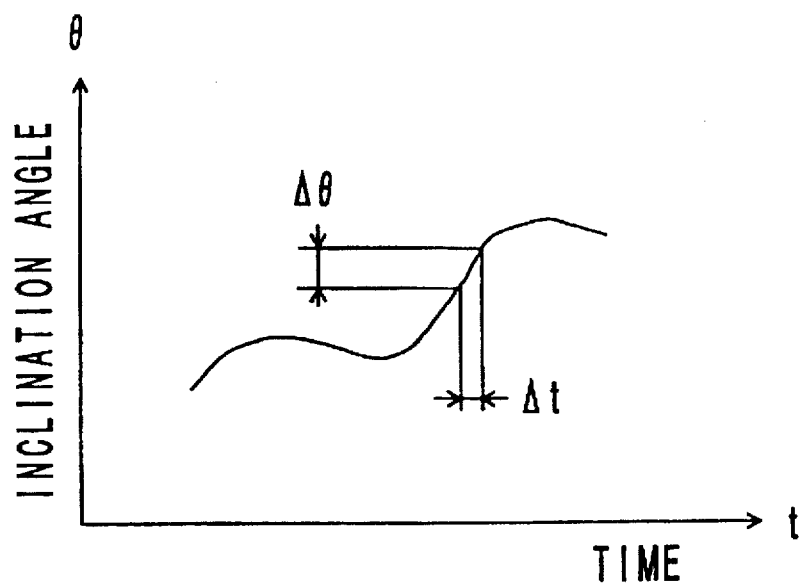
FIGS. 14A and 14B are graphs which show an attitude change of a camera per unit time.
Figure 14B:
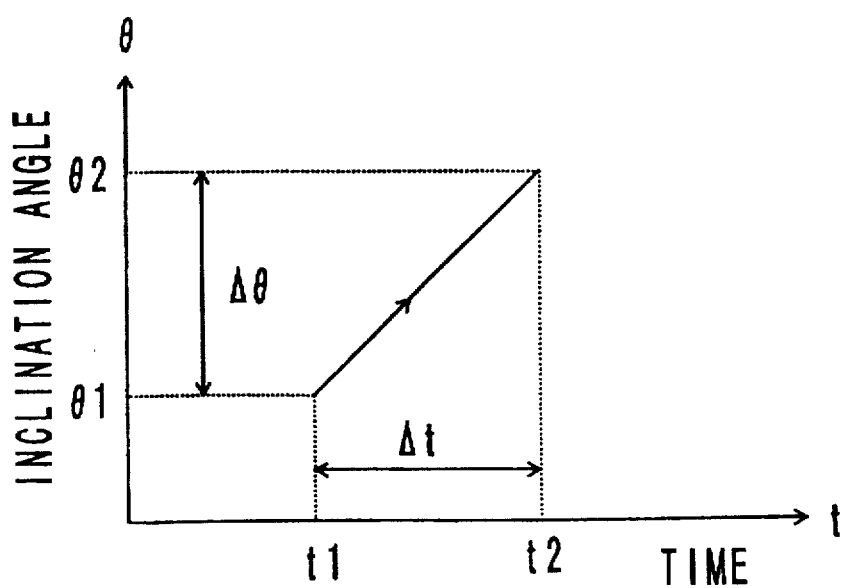

When the attitude of the camera changes from the attitude thereof in FIG. 12A and the camera is more inclined with an inclination angle θ2 as shown in FIG. 13A, a force which acts at the contact point 2a is N1B and a force which acts at the contact point 2b is N2B as shown in FIG. 13B. The control device 100A calculates the inclination angle θ2 of the camera in the pitching direction based on signals which correspond to these forces N1B and N2B in similar manner described above.

A difference of attitude Δθ between cameras in FIG. 12A and FIG. 13A is expressed as:

$$\Delta\theta = \theta_2 - \theta_1 \tag{6}$$

The difference of attitude per unit time to which the camera is subjected becomes big as the Δθ becomes big. If a time required for a difference of attitude Δθ is represented by Δt, the angular velocity ω according to the attitude change of the camera is expressed as:

$$\omega = (\theta_2 - \theta_1)/(t_2 - t_1) = \Delta\theta/\Delta t \tag{7}$$

Consequently, the control device 100A calculates forces at the contact points 2a and 2b based on a pressure distribution signal inputted from the pressure sensing sheet 2 per unit time in order to calculate inclination angles θ1 and θ2, and calculates angular velocity ω based on a difference of attitude Δθ which is a difference of the inclination angles, so that a difference of attitude in the pitching direction of the camera, that is a pitching vibration, is detected.

Yawing vibration detection

A yawing vibration Vy around the axis Y of the camera in FIG. 9 when the camera is held in a horizontal position is detected by using detection apparatuses 12 and 13 for acceleration detecting apparatuses. When the camera is held in a horizontal position, since a XZ plane extends in a horizontal direction, the outputs of the detecting apparatuses 12 and 13 are not influenced from gravitation even if the attitude of the camera changes around the axis Y. Thus, the detecting apparatuses 12 and 13 are employed for acceleration detecting apparatuses which detect an acceleration to detect a yawing vibration. Since the detecting apparatuses 12 and 13 detecting an acceleration are spaced a predetermined distance apart in a direction of the optical axis, different forces act at contact points 2a and 2b of detecting apparatuses 12 and 13, respectively, when the camera rotates in the yawing vibration direction. In other words, detecting apparatuses 12 and 13 detect different values of acceleration, so that a rotary angular velocity in a yawing direction of the camera can be detected based on the difference. Accordingly, a difference of attitude in the yawing direction of the camera, that is a yawing vibration, can be detected.

Figure 15:
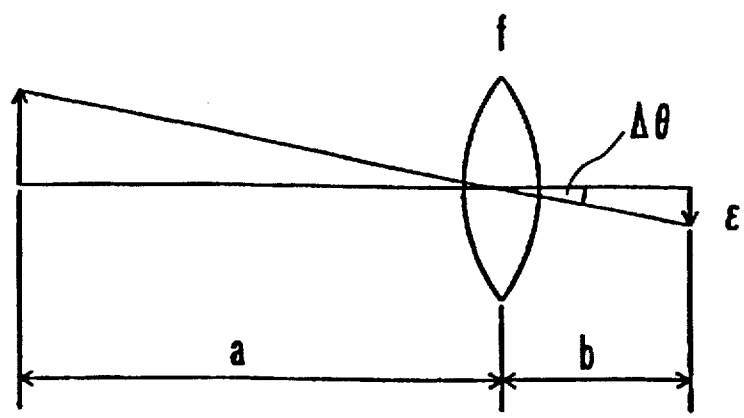
FIG. 15 is a figure which explains a relationship between a focal length f (mm) and an amount ε of an image vibration.

FIG. 15 is a figure which explains a relationship between a focal length f (mm) of a photographic lens and an amount of an image vibration ε caused by a pitching vibration and a yawing vibration of a camera. The relationship between both will be explained in the following.

In FIG. 15, following expressions result from the image formation formula.

$$(1/a)+(1/b)=(1/f)$$

$$b=af/(a-f)$$

Consequently, the amount of image vibration ε which is generated in case of the difference of attitude Δθ is expressed as:

$$\epsilon = b \cdot \tan(\Delta\theta) = \{af/(a-f)\}\tan(\Delta\theta) \tag{8}$$

A distance to a subject a is measured with the range-finding device 19, and a focal length f is detected with the focal length detection device 20. And they are inputted to the control device 100A. The focal length detection device 20 detects focal length information from a ROM in the lens in case of a fixed focal length lens or from a zoom encoder in case of a zoom lens.

The amount of an image vibration ε calculated in this manner is compared with a threshold value in the control device 100A. When the amount of an image vibration ε is bigger than the threshold value, the image vibration is compensated with the compensation optical system 18. Generally, when photography is performed with a camera which uses a 35 mm film, an amount of an image vibration which is equal to or less than 30 μm does not have a problem on photography. Consequently, in this embodiment, the threshold value is set as 30 μm. However, when photography is performed with a camera held in a horizontal position, the photographic field tends to have many horizontal lines, so that a pitching vibration which causes a vibration of the horizontal lines is stands out more than a yawing vibration, and when photography is performed with a camera held in a vertical position, the photographic field tends to have many vertical lines, so that a yawing vibration which causes a vibration of the vertical lines is stands out more than a pitching vibration. Consequently, the threshold value for a pitching vibration is set less than that for a yawing vibration when photography is performed with a camera is held in a horizontal position. In the same way, the threshold value for a yawing vibration is set less than that for a pitching vibration when photography is performed with a camera is held in a vertical position.

The compensation optical system 18 is driven in a XY plane by the horizontal actuator 18A and the vertical actuator 18B. They drive the compensation optical system 18 in directions to cancel the amount of an image vibration ε calculated with the expression (8), so that the image vibration is prevented. The compensation optical system 18 is controlled based on the following value. First, the velocity of the camera vibration V in case that the angular velocity is ω is expressed as:

$$V = \{af/(a-f)\} \cdot \omega$$

The horizontal actuator 18A and the vertical actuator 18B are controlled based on this velocity of vibration V.

When the camera is held in a vertical position, the detecting apparatus 11 detects that the camera is held in a vertical position. When the camera is held in a vertical position, the pitching vibration detecting apparatuses 14 and 15 are set so that they work as acceleration detecting apparatuses which are not influenced from gravitation, and the yawing vibration detecting apparatuses 12 and 13 are set so that they work as detecting apparatuses for difference of attitude which can detect by influence from gravitation. The principle of detection is the same as when the camera is held in a horizontal position.

When the camera is inclined, for example inclined with 45 degrees around the axis Z, the pitching vibration detecting apparatuses 12 and 13, and the yawing vibration detecting apparatuses 14 and 15 all are influenced from gravitation. Consequently, they all can be used for detecting apparatuses for difference of attitude. On the other hand, it is possible that they all are used for acceleration detecting apparatuses in any attitudes.

Figure 16B:
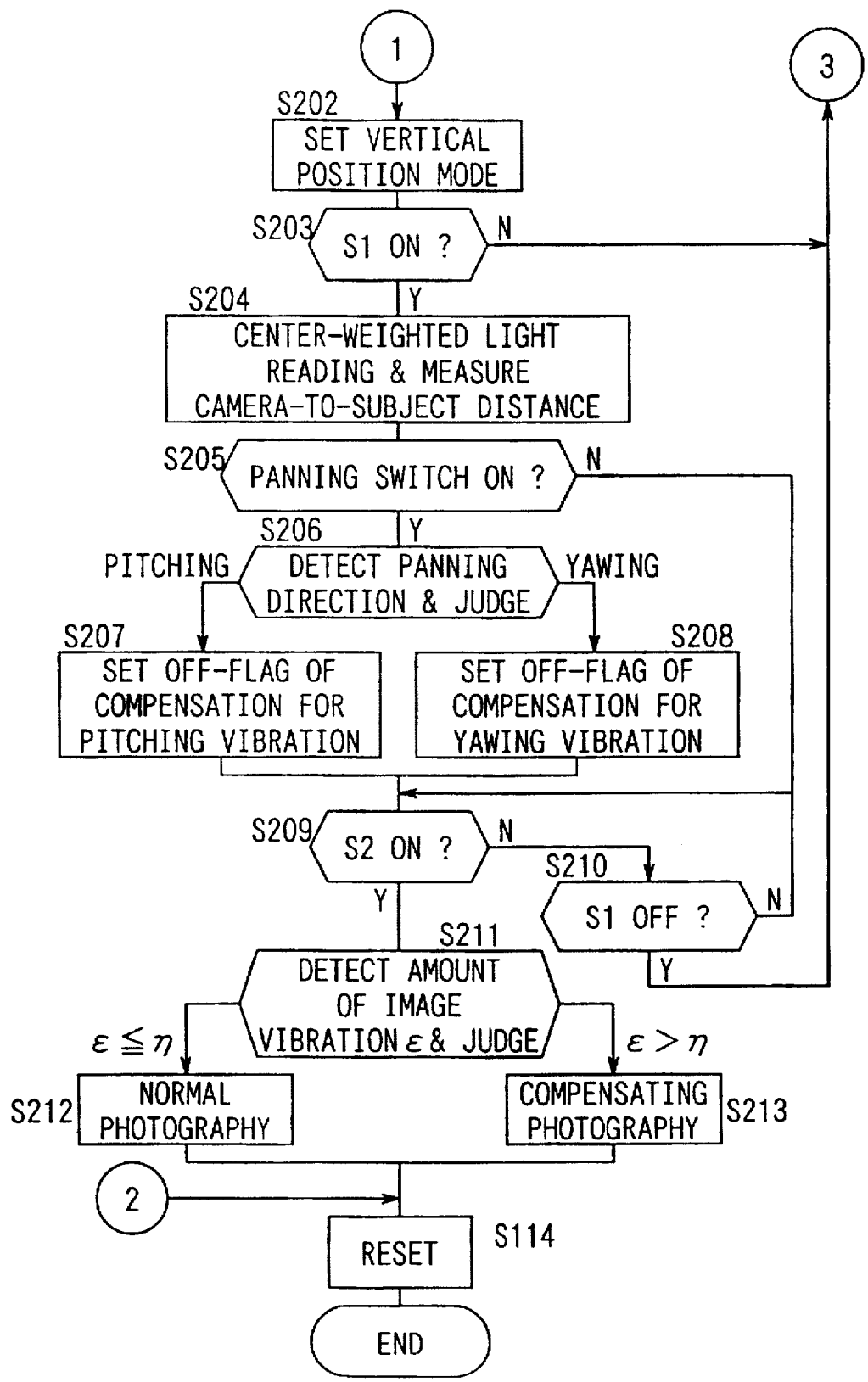

The operation of the image vibration-proof camera of this embodiment in case that the camera is used for panning photography will be explained with references to FIGS. 16A, 16B and 11.

In the step S101, an attitude of the camera is detected based on attitude data which are inputted from the detecting apparatus 11 to the control device 100A. In this embodiment, the attitude is judged according to an inclined angle around the axis Z against the XZ plane (refer to FIG. 10A). When the inclined angle is less than 45 degrees, the camera is judged to be in a horizontal position, and when the inclined angle is 45 degrees or more, the camera is judged to be in a vertical position. When the camera is judged to be in a horizontal position, the flow of control proceeds to the step S102, and when the camera is judged to be in a vertical position, the flow of control proceeds to the step S202.

An explanation will be made on the case that the camera is judged to be in a horizontal position.

In the step S102, a horizontal position mode is set, and judgement is made whether the detecting apparatuses 12 through 15 are used for detecting apparatuses for difference of attitude or acceleration detecting apparatuses. The threshold values for a pitching vibration and a yawing vibration in case that the camera is held in a horizontal position are set in this step S102.

In the step S103, judgement is made whether the halfway depression switch SW1 is turned on or not. When a photographer presses a release button halfway down, the switch SW1 is judged to be turned on, and the flow of control proceeds to the step S104. In the step S104, since the camera is held in a horizontal position, a multiple segment exposure metering is performed based on the output from the photometric device 17, and at the same time a camera-to-subject distance is measured with the range-finding device 19.

In the step S105, judgement is made whether the panning switch SW3 is turned on or off. If the panning switch SW3 is judged to be turned off in the step S105, a compensation in a panning direction is not performed and the flow of control proceeds to the step S109. If the switch SW3 is judged to be turned on, the flow of control proceeds to the step S106. In the step 106, a panning direction is detected. A panning direction in case that the camera is panned in a horizontal direction is the same as the yawing direction, and a panning direction in case that the camera is panned in a vertical direction is the same as the pitching direction. Consequently, the panning direction of the camera can be detected based on the difference of attitude Δθ of the camera which are obtained from detecting apparatuses 12, 13, 14 and 15. When the panning direction is in the pitching direction, an off-flag of compensation for pitching vibration is set in the step S107, and when the panning direction is in the yawing direction, an off-flag of compensation for yawing vibration is set in the step S108, so that a camera movement in a panning direction is prevented from judging as a camera vibration. The off-flag of compensation for pitching vibration or the off-flag of compensation for yawing vibration is information to prohibit the corresponding compensation of vibration in the step S113 described later.

When a photographer presses a release button all the way down, the full depression switch SW2 is judged to be turned on in the step S109, and then the flow of control proceeds to the step S111. In the step S111, a vibration is detected and judgement is made which value is big or small the detected value or the threshold value. In other words, in the step S111, detected signals of vibration outputted from detecting apparatuses 12, 13, 14 and 15 are received respectively, and an amount of an image vibration ε is calculated. The calculated amount of image vibration ε is compared with the threshold value η which is predefined, and if the amount of an image vibration ε is equal to or less than the threshold value, there is no possibility of image vibration. Consequently, the flow of control proceeds to the step S112 and then photography is performed without driving the compensation optical system 18. On the other hand, if the amount of an image vibration ε is more than the threshold value η, there is a possibility of image vibration. Consequently, the flow of control proceeds to the step S113 and then a photography is performed with compensating the image vibration by driving the compensation optical system 18 with the horizontal actuator 18A and the vertical actuator 18B. The calculation of the amount of an image vibration ε means both calculations of image vibrations caused by a pitching vibration and a yawing vibration, respectively. The threshold value η includes both the normal threshold value and the little smaller threshold value for a pitching vibration in case that the camera is held in a horizontal position.

When the camera is judged to be in a vertical position in the step S101, steps except following steps are the same as in case that the camera is held in a horizontal position.

In the step S202, a vertical position mode is set, and the detecting apparatuses 12 through 15 are decided to be used for detecting apparatuses for difference of attitude or acceleration detecting apparatuses. The threshold values for a pitching vibration and a yawing vibration in case that the camera is held in a vertical position are set in this step.

In the step S204, since the camera is held in a vertical position, a center-weighted light reading is processed based on the output from the photometric device 17, and at the same time a camera-to-subject distance is measured with the range-finding device 19.

Similarly to the step S111, in the step S211, the calculation of the amount of an image vibration means both calculations of image vibrations caused by a pitching vibration and a yawing vibration, while the threshold value η includes both the normal threshold value and the little smaller threshold value for a yawing vibration in case that the camera is held in a vertical position.

After a series of processes in case that the camera is held in a horizontal position or in a vertical position is completed, the flow of control proceeds to the step S114, so that the program is reset and the process is terminated.

Figure 16C:
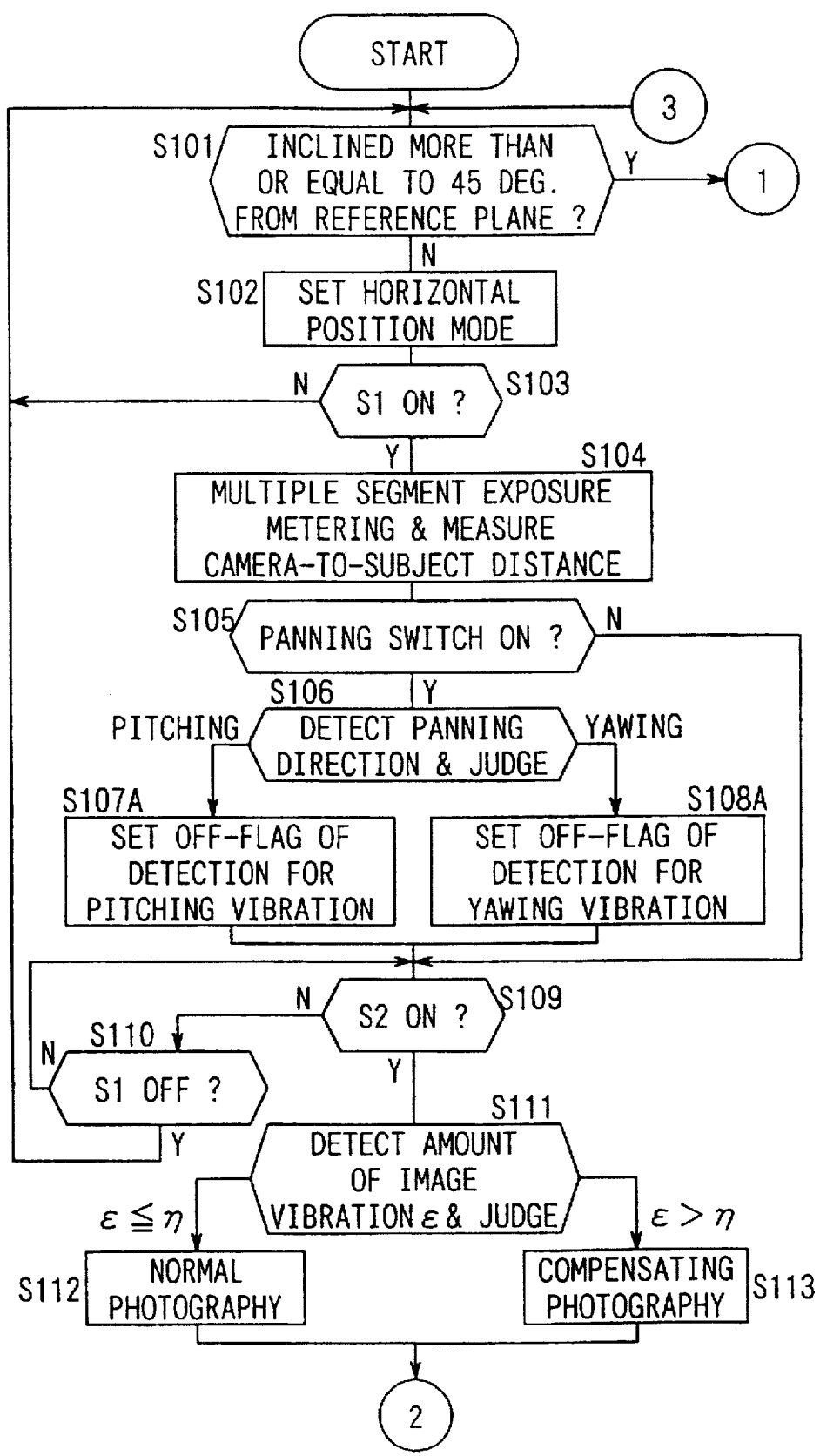
FIGS. 16C and 16D are flow-charts which explain a variation of FIGS. 16A and 16B.
Figure 16D:
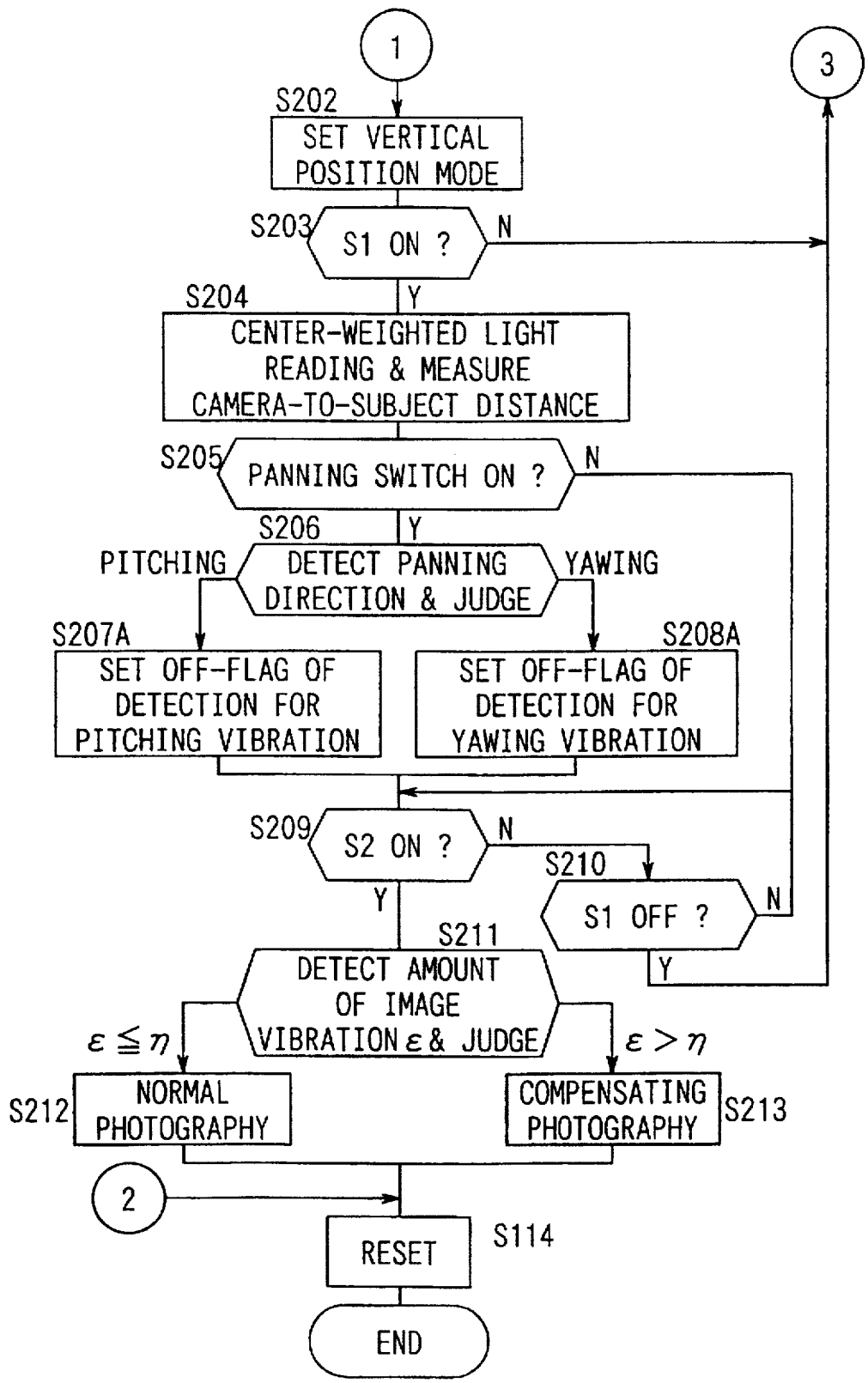

AS shown in FIG. 16C and FIG. 16D, it is possible that an off-flag of detection for pitching vibration or an off-flag of detection for yawing vibration is set in the step S107A, S108A, S207A or S208A and the corresponding detection of vibration is prohibited in the step S111.

<Embodiment of a Horizontality and Verticality Display Apparatus>

Figure 17A:
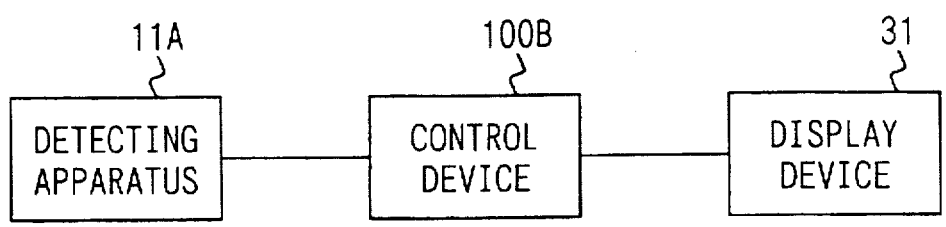
FIG. 17A is a block diagram of an embodiment of a horizontality and verticality display apparatus according to the present invention.

FIG. 17A is a block diagram of an embodiment of a horizontality and verticality display apparatus in a camera.

Figure 17B:
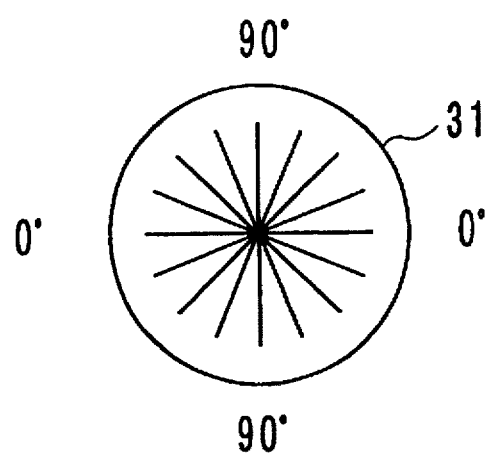
FIG. 17B is a figure which shows an embodiment of a display device of a horizontality and verticality display apparatus according to the present invention.

The reference numeral 11A and 100B are the same as the detecting apparatus 11 and the control device 100A in FIG. 11, respectively. A signal from the detecting apparatus 11A is inputted to the control device 100B, and an inclination of the detecting apparatus 11A, that is an inclination θ of the camera, is calculated in the control device 100B. The control device 100B outputs a signal to a display device 31 based on the obtained inclination θ, and the horizontality of the camera is displayed on the display device 31. FIG. 17B shows an embodiment of the display device 31 which is actualized with LEDs. The display device 31 consists of eight display bars each of which comprises a plurality of LEDs arranged radially from the center, and one of the bars is lighted based on the output signal from the detecting apparatus 11A and the horizontal attitude of the camera can display visually.

In case of a verticality display device, an attitude of the camera around the axis X in FIG. 10 is detected and the verticality can display according to the attitude.

<Embodiment of a Height Detecting and Displaying Apparatus>

Figure 18A:
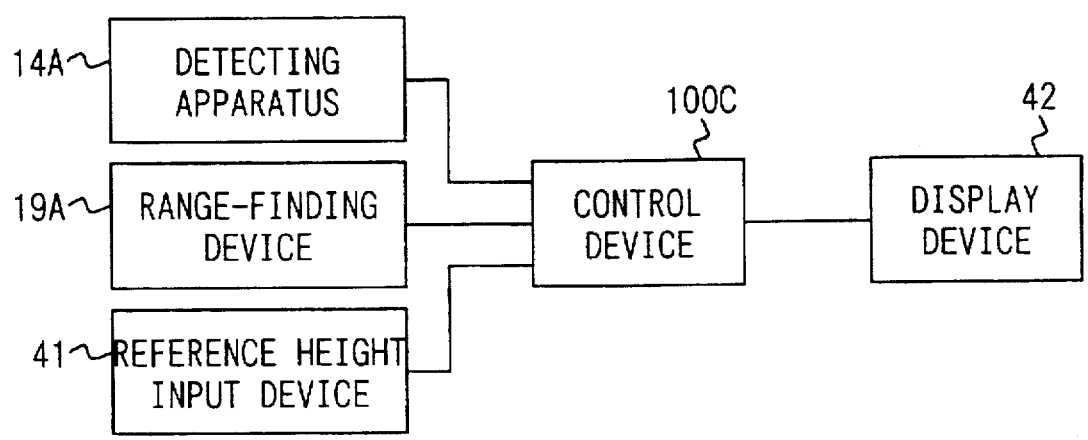
FIG. 18A is a block diagram of an embodiment of a height detecting and displaying apparatus according to the present invention.
Figure 18B:
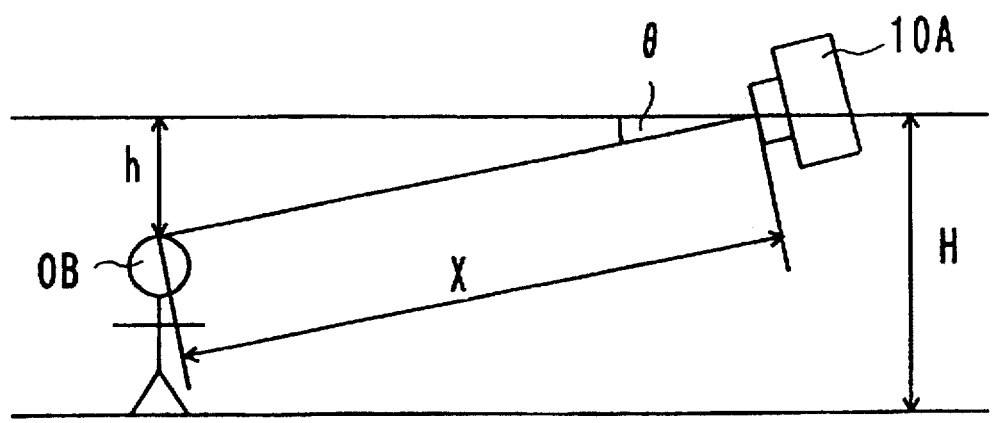
FIG. 18B is a figure which explains height detecting.

FIG. 18A is a block diagram of an embodiment of a height detecting and displaying apparatus. FIG. 18B is a figure which explains detecting a height of a subject OB by using a camera 10A. When a subject and a photographer are in the same plane as shown in FIG. 18B, a height of the camera position from the plane is inputted into the camera by the photographer and the camera is pointed to a position of the subject to be obtained, then the height of the subject from the plane can be obtained. The expression to obtain h is as follows.

$$h = x \cdot SIN\theta$$

In FIG. 18A, the reference numerals 14A, 19A and 100C are the same as the detecting apparatus 14, the range-finding device 19 and the control device 100A in FIG. 11, respectively. In FIG. 18A, a signal from the detecting apparatus 14A is inputted to the control device 100C, an inclination θ of the camera is calculated in the control device 100C. The reference numeral 19A denotes a range finding device of a camera-to-subject distance which measures a camera-to-subject distance x and inputs it to the control device 100C. The reference numeral 41 denotes an input device which inputs a height H of the camera position and inputs the inputted data to the control device 100C. The control device 100C calculates the height of the subject with the above-described expression based on the calculated inclination θ of the camera, the measured camera-to-subject distance x and the inputted data of the height H of the camera position. The obtained height of the subject is displayed on the display device 42. A known LED or LCD can be used for the display device 42.

Figure 19:
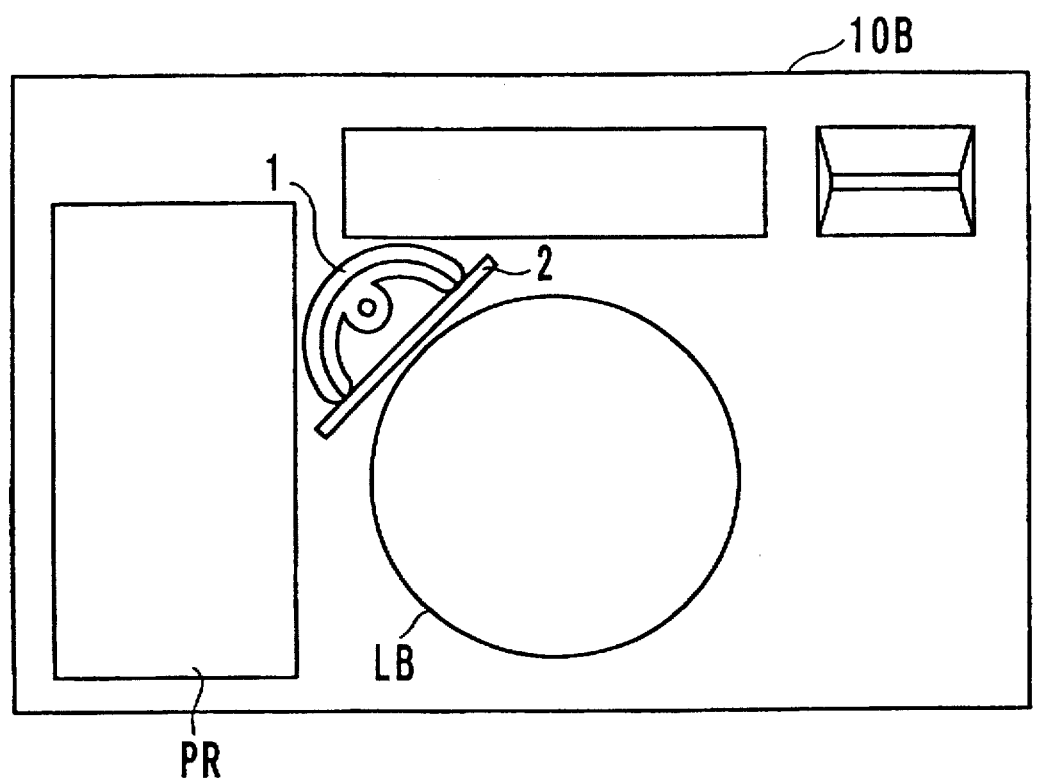
FIG. 19 is a front view of an application of a camera where an arrangement of a detecting apparatus according to the present invention is improved.

FIG. 19 shows an embodiment which utilizes a space of a camera effectively. In FIG. 10A, the balancer 1 and the pressure sensing sheet 2 are arranged so that N1 equals to N2 when the camera is held in a horizontal position. However, it is possible that the balancer 1 and the pressure sensing sheet 2 are arranged in a space between a lens barrel LB and a patrone room PR, wherein the balancer 1 and the pressure sensing sheet 2 are inclined with 45 degrees. As a result, the space factor in the camera 10B can be improved.

In the present invention, other modifications will be possible. For example, in embodiments of a detecting apparatus, a balancer 1 which contacts at two contact points or one contact point with a pressure sensing sheet 2 as shown in FIG. 1 and 2 is used, however, it is possible that the number of contact points with the pressure sensing sheet 2 is three or more. The balancer 1 is formed with a sheet-shaped member, however, it is possible that the balancer is formed with a bar-shaped member. An image vibration-proof still camera was explained as an embodiment, however, the present invention also can apply to a video camera. The present invention can apply to an electronic still camera and a rolling vibration which can be detected with the same principle can be compensated with image processing on the electronic still camera. In a camera which does not have a function of compensating an image vibration, the image vibration can be prevented by having a warning device to warn a photographer and/or a prohibiting device to prohibit a shutter operation when a vibration is detected. An output of an attitude detecting apparatus can be applied to a multiple segment exposure metering and also to selecting a position where a date is imprinted. A horizontality and verticality display apparatus was shown as an embodiment in a camera, however, a stand-alone horizontality and verticality display device is possible, for example, for a car. A height detecting and displaying apparatus was shown as an embodiment which detects a height of a subject in a camera, however, it is not limited to the camera and can apply to a surveyor's apparatus.

We claim:

1. A detecting apparatus, comprising:
   a balancer which generates a moment of rotation around an axis;
   a supporting member which is formed differently from said balancer; and
   a pressure sensing sheet which is supported by said supporting member, contacts at one or more contact points with said balancer and outputs a pressure signal corresponding to a pressure force by said balancer acting on said contact point and depending on said moment of rotation.

2. A detecting apparatus according to claim 1, wherein:
   said balancer comprises a supporting section rotatably supported by said axis at one end of said balancer, a body which extends from said supporting section to the other end, and an acting member which is connected with said body, the tip of said acting member contacting at said contact point of said pressure sensing sheet, said detecting apparatus further comprising:
   an urging member which presses said balancer to said pressure sensing sheet with a predefined force.

3. A detecting apparatus according to claim 1, wherein:
   said balancer comprises a supporting section rotatably supported by said axis at the center of said balancer, and a pair of right and left balancing members which are symmetric with respect to a line of action of the center of gravity of said balancer, said line passing said supporting section and said balancing members having said contact points respectively, and said detecting apparatus further comprising:
   an urging member which presses said balancer to said pressure sensing sheet so that pressures on said contact points of said pair of right and left balancing members have predefined values.

4. An attitude detecting apparatus, comprising:
   a balancer which generates a moment of rotation around an axis;
   a supporting member which is formed differently from said balancer;
   a pressure sensing sheet which is supported by said supporting member, contacts at one or more contact points with said balancer and outputs a pressure signal corresponding to a pressure force by said balancer which acts on said contact point and depends on said moment of rotation; and an arithmetic circuit which receives said pressure signal and calculates an attitude angle to a reference attitude.

5. A detecting apparatus according to claim 4, wherein:

said balancer comprises a supporting section rotatably supported by said axis at one end of said balancer, a body which extends from said supporting section to the other end, and an acting member which is connected with said body, the tip of said acting member contacting at said contact point of said pressure sensing sheet, said detecting apparatus further comprising:

an urging member which presses said balancer to said pressure sensing sheet with a predefined force.

6. A detecting apparatus according to claim 4, wherein:

said balancer comprises a supporting section rotatably supported by said axis at the center of said balancer, and a pair of right and left balancing members which are symmetric with respect to a line of action of the center of gravity of said balancer, said line passing said supporting section and said balancing members having said contact points respectively, and said detecting apparatus further comprising:

an urging member which presses said balancer to said pressure sensing sheet so that pressures on said contact points of said pair of right and left balancing members have predefined values.

7. A detecting apparatus for difference of attitude, comprising:

a balancer which generates a moment of rotation around an axis;

a supporting member which is formed differently from said balancer;

a pressure sensing sheet which is supported by said supporting member, contacts at one or more contact points with said balancer and outputs a pressure signal corresponding to a pressure force by said balancer which acts on said contact point and depends on said moment of rotation; and an arithmetic circuit which receives said pressure signal at predefined time intervals in order and calculates a difference of attitude.

8. A detecting apparatus according to claim 7, wherein:

said balancer comprises a supporting section rotatably supported by said axis at one end of said balancer, a body which extends from said supporting section to the other end, and an acting member which is connected with said body, the tip of said acting member contacting at said contact point of said pressure sensing sheet, said detecting apparatus further comprising:

an urging member which presses said balancer to said pressure sensing sheet with a predefined force.

9. A detecting apparatus according to claim 7, wherein:

said balancer comprises a supporting section rotatably supported by said axis at the center of said balancer, and a pair of right and left balancing members which are symmetric with respect to a line of action of the center of gravity of said balancer, said line passing said supporting section and said balancing members having said contact points respectively, and said detecting apparatus further comprising:

an urging member which presses said balancer to said pressure sensing sheet so that pressures on said contact points of said pair of right and left balancing members have predefined values.

10. An acceleration detecting apparatus, comprising:

a balancer which generates a moment of rotation around an axis;

a supporting member which is formed differently from said balancer;

a pressure sensing sheet which is supported by said supporting member, contacts at one or more contact points with said balancer and outputs a pressure signal corresponding to a pressure force by said balancer which acts on said contact point and depends on said moment of rotation; and an arithmetic circuit which receives said pressure signal and calculates an acceleration which acts on said balancer based on the received pressure signal.

11. A detecting apparatus according to claim 10, wherein:

said balancer comprises a supporting section rotatably supported by said axis at one end of said balancer, a body which extends from said supporting section to the other end, and an acting member which is connected with said body, the tip of said acting member contacting at said contact point of said pressure sensing sheet, said detecting apparatus further comprising:

an urging member which presses said balancer to said pressure sensing sheet with a predefined force.

12. A detecting apparatus according to claim 10, wherein:

said balancer comprises a supporting section rotatably supported by said axis at the center of said balancer, and a pair of right and left balancing members which are symmetric with respect to a line of action of the center of gravity of said balancer, said line passing said supporting section and said balancing members having said contact points respectively, and said detecting apparatus further comprising:

an urging member which presses said balancer to said pressure sensing sheet so that pressures on said contact points of said pair of right and left balancing members have predefined values.

13. A camera capable of detecting an attitude, comprising:

a balancer which generates a moment of rotation around an axis;

a supporting member which is formed differently from said balancer;

a pressure sensing sheet which is supported by said supporting member, contacts at one or more contact points with said balancer and outputs a pressure signal corresponding to a pressure force by said balancer which acts on said contact point and depends on said moment of rotation; and an arithmetic circuit which receives said pressure signal, calculates an attitude angle to a reference attitude, and determines whether said camera is held in a horizontal position or in a vertical position.

14. A camera according to claim 13, wherein:

said balancer comprises a supporting section rotatably supported by said axis at one end of said balancer, a body which extends from said supporting section to the other end, and an acting member which is connected with said body, the tip of said acting member contacting at said contact point of said pressure sensing sheet, said camera further comprising:

an urging member which presses said balancer to said pressure sensing sheet with a predefined force.

15. A camera according to claim 13, wherein:

said balancer comprises a supporting section rotatably supported by said axis at the center of said balancer, and a pair of right and left balancing members which are symmetric with respect to a line of action of the center of gravity of said balancer, said line passing said supporting section and said balancing members having said contact points respectively, and said camera further comprising:

an urging member which presses said balancer to said pressure sensing sheet so that pressures on said contact points of said pair of right and left balancing members have predefined values.

16. An image vibration-proof camera, comprising:

a photographic lens through which light from a subject forms an image;

a balancer which generates a moment of rotation around an axis;

a supporting member which is formed differently from said balancer;

a pressure sensing sheet which is supported by said supporting member, contacts at one or more contact points with said balancer and outputs a pressure signal corresponding to a pressure force by said balancer which acts on said contact point and depends on said moment of rotation;

an arithmetic circuit which receives said pressure signal at predefined time intervals in order, calculates a difference of attitude, and calculates an amount of image vibration caused by a pitching vibration based on at least said difference of attitude; and a compensation optical system which compensates said light from a subject based on said amount of image vibration in order to prevent said image vibration from occurring.

17. A camera according to claim 16, wherein:

said balancer comprises a supporting section rotatably supported by said axis at one end of said balancer, a body which extends from said supporting section to the other end, and an acting member which is connected with said body, the tip of said acting member contacting at said contact point of said pressure sensing sheet, said camera further comprising:

an urging member which presses said balancer to said pressure sensing sheet with a predefined force.

18. A camera according to claim 16, wherein:

said balancer comprises a supporting section rotatably supported by said axis at the center of said balancer, and a pair of right and left balancing members which are symmetric with respect to a line of action of the center of gravity of said balancer, said line passing said supporting section and said balancing members having said contact points respectively, and said camera further comprising:

an urging member which presses said balancer to said pressure sensing sheet so that pressures on said contact points of said pair of right and left balancing members have predefined values.

19. An image vibration-proof camera, comprising:

a photographic lens through which light from a subject forms an image;

a balancer which generates a moment of rotation around an axis;

a supporting member which is formed differently from said balancer;

a pressure sensing sheet which is supported by said supporting member, contacts at one or more contact points with said balancer and outputs a pressure signal corresponding to a pressure force by said balancer which acts on said contact point and depends on said moment of rotation;

an arithmetic circuit which receives said pressure signal, calculates an acceleration acting on said balancer based on the received pressure signal, and calculates an amount of image vibration caused by a yawing vibration; and a compensation optical system which compensates said light from a subject based on said amount of image vibration in order to prevent said image vibration from occurring.

20. A camera according to claim 19, wherein:

said balancer comprises a supporting section rotatably supported by said axis at one end of said balancer, a body which extends from said supporting section to the other end, and an acting member which is connected with said body, the tip of said acting member contacting at said contact point of said pressure sensing sheet, said camera further comprising:

an urging member which presses said balancer to said pressure sensing sheet with a predefined force.

21. A camera according to claim 19, wherein:

said balancer comprises a supporting section rotatably supported by said axis at the center of said balancer, and a pair of right and left balancing members which are symmetric with respect to a line of action of the center of gravity of said balancer, said line passing said supporting section and said balancing members having said contact points respectively, and said camera further comprising:

an urging member which presses said balancer to said pressure sensing sheet so that pressures on said contact points of said pair of right and left balancing members have predefined values.

22. An image vibration-proof camera, comprising:

a photographic lens through which light from a subject forms an image;

a first detecting apparatus and a second dectecting apparatus each of which comprises a balancer which generates a moment of rotation around an axis, a supporting member which is formed differently from said balancer and a pressure sensing sheet which is supported by said supporting member, contacts at one or more contact points with said balancer and outputs a pressure signal corresponding to a pressure force by said balancer acting on said contact point and depending on said moment of rotation, respectively;

an arithmetic circuit which receives said pressure signal from said first detecting apparatus at predefined time intervals in order, calculates a difference of attitude and calculates an amount of image vibration caused by a pitching vibration based on said difference of attitude, and also receives said pressure signal from said second detecting apparatus, calculates an acceleration acting on said balancer based on the received pressure signal and calculates an amount of image vibration caused by a yawing vibration; and a compensation optical system which compensates said light from a subject based on said amounts of image vibration caused by said pitching vibration and said yawing vibration in order to prevent said image vibration from occurring.

23. A camera according to claim 22, wherein:

said balancer comprises a supporting section rotatably supported by said axis at one end of said balancer, a body which extends from said supporting section to the other end, and an acting member which is connected with said body, the tip of said acting member contacting at said contact point of said pressure sensing sheet, each said detecting apparatus further comprising:

an urging member which presses said balancer to said pressure sensing sheet with a predefined force.

24. A camera according to claim 22, wherein:

said balancer comprises a supporting section rotatably supported by said axis at the center of said balancer, and a pair of right and left balancing members which are symmetric with respect to a line of action of the center of gravity of said balancer, said line passing said supporting section and said balancing members having said contact points respectively, and each said detecting apparatus further comprising:

an urging member which presses said balancer to said pressure sensing sheet so that pressures on said contact points of said pair of right and left balancing members have predefined values.

25. An image vibration-proof camera, comprising:

a photographic lens through which light from a subject forms an image;

an attitude detecting apparatus which detects whether said camera is held in a horizontal position or in a vertical position;

a first detecting apparatus and a second detecting apparatus which each comprise a vertical balancer which generates a moment of rotation around an axis, a supporting member which is formed differently from said vertical balancer and a pressure sensing sheet which is supported by said supporting member, contacts at one or more contact points with said vertical balancer and outputs a pressure signal corresponding to a pressure force by said vertical balancer acting on said contact point and depending on said moment of rotation, respectively, said first and second detecting apparatuses being arranged in a vertical plane of said camera parallel to an optical axis of said photographic lens so that said moments of rotation are generated in said vertical plane;

a third detecting apparatus and a fourth detecting apparatus which each comprise a horizontal balancer which generates a moment of rotation around an axis, a supporting member which is formed differently from said horizontal balancer and a pressure sensing sheet which is supported by said supporting member, contacts at one or more contact points with said horizontal balancer and outputs a pressure signal corresponding to a pressure force by said horizontal balancer acting on said contact point and depending on said moment of rotation, respectively, said third and fourth detecting apparatuses being arranged in a horizontal plane of said camera so that said moments of rotation are generated in said horizontal plane;

an arithmetic circuit which, (a) when said attitude detecting apparatus judges that said camera is held in a horizontal position, receives said pressure signal from said first detecting apparatus at predefined time intervals in order and calculates a difference of attitude, and then calculates an amount of image vibration caused by a pitching vibration based on said difference of attitude, and also receives said pressure signal from said third and fourth detecting apparatuses and calculates an acceleration acting on said horizontal balancers based on the received pressure signal, and then calculates an amount of image vibration caused by a yawing vibration, and which, (b) when said attitude detecting apparatus judges that said camera is held in a vertical position, said arithmetic circuit receives said pressure signal from said third detecting apparatus at predefined time intervals in order and calculates a difference of attitude, and then calculates an amount of image vibration caused by a pitching vibration based on said difference of attitude, and also receives said pressure signal from said first and second detecting apparatuses and calculates an acceleration acting on said vertical balancers based on the received pressure signal, and then calculates an amount of image vibration caused by a yawing vibration; and a compensation optical system which compensates said light from a subject based on said amounts of image vibration caused by said pitching vibration and said yawing-vibration in order to prevent said image vibration from occurring.

26. A camera according to claim 25, wherein:

said vertical and horizontal balancers each comprise a supporting section rotatably supported by said axis at one end of said balancer, a body which extends from said supporting section to the other end, and an acting member which is connected with said body, the tip of said acting member contacting at said contact point of said pressure sensing sheet, each said detecting apparatus further comprising:

an urging member which presses said balancer to said pressure sensing sheet with a predefined force.

27. A camera according to claim 25, wherein:

said vertical and horizontal balancers each comprise a supporting section rotatably supported by said axis at the center of said balancer, and a pair of right and left balancing members which are symmetric with respect to a line of action of the center of gravity of said balancer, said line passing said supporting section and said balancing members having said contact points respectively, and each said detecting apparatus further comprising:

an urging member which presses said balancer to said pressure sensing sheet so that pressures on said contact points of said pair of right and left balancing members have predefined values.

28. A horizontality and verticality display apparatus, comprising:

a balancer which generates a moment of rotation around an axis;

a supporting member which is formed differently from said balancer;

a pressure sensing sheet which is supported by said supporting member, contacts at one or more contact points with said balancer and outputs a pressure signal corresponding to a pressure force by said balancer acting on said contact point and depending on said moment of rotation;

an arithmetic circuit which receives said pressure signal and calculates an attitude angle to a reference attitude; and a display device which displays the calculated attitude angle.

29. A display apparatus according to claim 28, wherein:

said balancer comprises a supporting section rotatably supported by said axis at one end of said balancer, a body which extends from said supporting section to the other end, and an acting member which is connected with said body, the tip of said acting member contacting at said contact point of said pressure sensing sheet, said display apparatus further comprising:

an urging member which presses said balancer to said pressure sensing sheet with a predefined force.

30. A display apparatus according to claim 28, wherein:

said balancer comprises a supporting section rotatably supported by said axis at the center of said balancer, and a pair of right and left balancing members which are symmetric with respect to a line of action of the center of gravity of said balancer, said line passing said supporting section and said balancing members having said contact points respectively, and said display apparatus further comprising:

an urging member which presses said balancer to said pressure sensing sheet so that pressures on said contact points of said pair of right and left balancing members have predefined values.

31. A height detecting and displaying apparatus, comprising:

a balancer which generates a moment of rotation around an axis;

a supporting member which is formed differently from said balancer;

a pressure sensing sheet which is supported by said supporting member, contacts at one or more contact points with said balancer and outputs a pressure signal corresponding to a pressure force by said balancer acting on said contact point and depending on said moment of rotation;

an attitude angle arithmetic circuit which receives said pressure signal and calculates an attitude angle to a reference attitude;

a range-finding device which measures a distance to an object;

an input device to which a reference height is inputted;

a height arithmetic circuit which calculates a height of said object based on the measured distance, the calculated attitude angle and an inputted height; and a display device which displays a calculated height of said object.

32. A height detecting and displaying apparatus according to claim 31, wherein:

said balancer comprises a supporting section rotatably supported by said axis at one end of said balancer, a body which extends from said supporting section to the other end, and an acting member which is connected with said body, the tip of said acting member contacting at said contact point of said pressure sensing sheet, said height detecting and displaying apparatus further comprising:

an urging member which presses said balancer to said pressure sensing sheet with a predefined force.

33. A height detecting and displaying apparatus according to claim 31, wherein:

said balancer comprises a supporting section rotatably supported by said axis at the center of said balancer, and a pair of right and left balancing members which are symmetric with respect to a line of action of the center of gravity of said balancer, said line passing said supporting section and said balancing members having said contact points respectively, and said height detecting and displaying apparatus further comprising:

an urging member which presses said balancer to said pressure sensing sheet so that pressures on said contact points of said pair of right and left balancing members have predefined values.

* * * * *